US010447884B2

(12) United States Patent
Koyanagi et al.

(10) Patent No.: US 10,447,884 B2
(45) Date of Patent: Oct. 15, 2019

(54) MEDIUM FEEDER AND IMAGE READING APPARATUS

(71) Applicant: SEIKO EPSON CORPORATION, Tokyo (JP)

(72) Inventors: Noriyuki Koyanagi, Kitakyushu (JP); Tokujiro Okuno, Kitakyushu (JP); Kazuhiko Arimori, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 15 days.

(21) Appl. No.: 15/622,670

(22) Filed: Jun. 14, 2017

(65) Prior Publication Data
US 2017/0366696 A1 Dec. 21, 2017

(30) Foreign Application Priority Data
Jun. 15, 2016 (JP) .................................. 2016-119199

(51) Int. Cl.
*H04N 1/04* (2006.01)
*H04N 1/12* (2006.01)
*H04N 1/00* (2006.01)
*B65H 3/06* (2006.01)
*B65H 5/06* (2006.01)
(Continued)

(52) U.S. Cl.
CPC .......... *H04N 1/1215* (2013.01); *B65H 3/063* (2013.01); *B65H 3/0653* (2013.01); *B65H 3/0669* (2013.01); *B65H 3/34* (2013.01); *B65H 3/5284* (2013.01); *B65H 5/062* (2013.01); *H04N 1/0061* (2013.01); *H04N 1/00602* (2013.01); *H04N 1/00615* (2013.01); *B65H 2402/46* (2013.01); *B65H 2403/42* (2013.01);
(Continued)

(58) Field of Classification Search
CPC ............ H04N 1/1215; H04N 1/00602; H04N 1/0061; H04N 1/00615; B65H 3/063; B65H 3/0653; B65H 3/0669; B65H 3/34; B65H 3/5284; B65H 5/062; B65H 2042/46; B65H 2403/42; B65H 2403/51; B65H 2045/324; B65H 2801/39
USPC .......................... 358/498, 496; 399/364, 374
See application file for complete search history.

(56) References Cited

U.S. PATENT DOCUMENTS 10,245,863 B2 * 4/2019 Nagase ...................... B41J 2/01
2005/0025541 A1 2/2005 Terae
(Continued)

FOREIGN PATENT DOCUMENTS

JP 04-242234 A 8/1992
JP 06-054132 A 2/1994
(Continued)

*Primary Examiner* — Cheukfan Lee
(74) *Attorney, Agent, or Firm* — Workman Nydegger

(57) ABSTRACT

A medium feeder includes a feed roller that feeds a medium loaded on a medium loading section; a transport roller disposed downstream relative to the feed roller; a first driving source that drives at least the feed roller; a second driving source that drives at least the transport roller; and a housing that houses the feed roller, the transport roller, the first driving source, and the second driving source, wherein the housing includes a lower unit that constitutes a lower part of the housing, and an upper unit openable relative to the lower unit, and the first driving source and the second driving source are disposed on both sides relative to a center part of the lower unit in a width direction perpendicular to a medium transportation direction.

14 Claims, 18 Drawing Sheets

(51) Int. Cl.
*B65H 3/34* (2006.01)
*B65H 3/52* (2006.01)

(52) U.S. Cl.
CPC .... *B65H 2403/51* (2013.01); *B65H 2405/324* (2013.01); *B65H 2801/39* (2013.01)

(56) References Cited

U.S. PATENT DOCUMENTS

| | | | |
|---|---|---|---|
| 2005/0184443 A1* | 8/2005 | Satoh | B65H 5/00 271/10.01 |
| 2013/0141487 A1* | 6/2013 | Abe | B41J 11/00 347/16 |
| 2014/0077449 A1 | 3/2014 | Umi et al. | |
| 2018/0093510 A1* | 4/2018 | Nagase | B41J 2/01 |

FOREIGN PATENT DOCUMENTS

| | | |
|---|---|---|
| JP | 2006-010855 A | 1/2006 |
| JP | 2014-060494 A | 4/2014 |

* cited by examiner

MEDIUM FEEDER AND IMAGE READING APPARATUS

BACKGROUND

1. Technical Field

The entire disclosure of Japanese Patent Application No: 2016-119199, filed Jun. 15, 2016 is expressly incorporated by reference herein in its entirety.

The present invention relates to a medium feeder that feeds a medium and an image reading apparatus having the medium feeder.

2. Related Art

In a scanner which is an example of the image reading apparatus, driving sources for various driving systems are provided inside the apparatus main body.

For example, in JP-A-4-242234, a stepping motor is used as a driving source for driving an optical system of a copier machine.

A scanner may include a medium feeder (also called an auto document feeder (ADF)) that automatically feeds a document as a medium so that a plurality of documents can be automatically fed to an image reading unit which is fixed inside the apparatus and read by the image reading unit (for example, see JP-A-2014-60494).

Such a medium feeder provided in the scanner includes a feed roller that feeds a document loaded on a document tray, a transport roller that transports the document fed out from the feed roller to the image reading unit, and the like, and these components are driven by a driving source such as a motor.

When a stepping motor such as that described in JP-A-4-242234 is used as a driving source for the medium feeder that feeds a document to the image reading unit which is fixed inside the apparatus, there is a risk of disorder in transportation of the document which occurs if load of the driving source varies during scanning by the image reading unit, and this may cause a disturbance in the read image. In order to solve this problem, a DC motor may be used as a driving source of a medium feeder (for example, see JP-A-6-54132 and JP-A-2006-10855).

Since a DC motor is provided with an encoder, it can perform feedback control in response to variation in load of the motor, thereby easily reducing a disturbance of the read image which occurs due to variation in load of the motor.

For the scanners having such a medium feeder, more compact apparatuses are needed by users. However, a space for a driving source such as a motor which is relatively heavy and large is limited, and a layout for components is also limited.

In particular, as an example of a small-sized scanner, a scanner described in JP-A-2014-60494 has a housing that constitutes the scanner and is divided into an upper unit (cover 11b) and a lower unit (main body 11a). The upper unit is configured to be open relative to the lower unit for maintenance of the medium feeder or the like. In this case, the weight balance when the upper unit is open is an important matter.

SUMMARY

An advantage of some aspects of the invention is that a medium feeder that can be mounted in a stable manner and an image reading apparatus having the same are provided. Further, another advantage is that a medium feeder or an image reading apparatus that can perform a stable feeding of a medium is provided.

A medium feeder according to a first aspect of the present invention includes a feed roller that feeds a medium loaded on a medium loading section; a transport roller disposed downstream relative to the feed roller; a first driving source that drives at least the feed roller; a second driving source that drives at least the transport roller; and a housing that houses the feed roller, the transport roller, the first driving source, and the second driving source, wherein the housing includes a lower unit that constitutes a lower part of the housing, and an upper unit that is openable relative to the lower unit, and the first driving source and the second driving source are disposed on both sides relative to a center part of the lower unit in a width direction perpendicular to a medium transportation direction.

According to the first aspect, two driving sources, that is, the first driving source and the second driving source are used as the driving sources in the medium feeder, and the first driving source and the second driving source are disposed on both sides relative to a center part of the lower unit in a direction perpendicular to a medium transportation direction. Accordingly, the medium feeder can be well balanced in weight.

Moreover, since both the first driving source and the second driving source are provided in the lower unit, the housing can remain stable when the upper unit is open relative to the lower unit. Accordingly, the medium feeder can be disposed in a stable manner.

In the medium feeder according to a second aspect of the present invention, the medium feeder further includes: a separation roller that cooperates with the feed roller to nip the medium therebetween for separation of the paper sheet; a downstream transport roller disposed downstream relative to the transport roller; a pressing unit that is provided so as to be advanced and withdrawn relative to the feed roller, and is configured to press the medium loaded on the medium loading section when advanced toward the feed roller; and a regulation unit configured to switch a regulation state in which the pressing unit is regulated from being advanced toward the feed roller and a permission state in which the pressing unit is permitted to be advanced toward the feed roller, wherein the separation roller, the downstream transport roller, and the regulation unit are driven by the second driving source.

According to the second aspect, the separation roller, the downstream transport roller, and the regulation unit can be driven by using a driving source (second driving source) in common with the transport roller.

In the medium feeder according to a third aspect of the present invention, the first driving source and the second driving source are DC motors, and the medium feeder includes: a first encoder that detects a rotation amount of a scale that rotates according to driving of the first driving source; a second encoder that detects a rotation amount of a scale that rotates according to driving of the second driving source; and a control unit that controls driving of the corresponding driving source on the basis of information detected by the first encoder or the second encoder.

According to the third aspect, the feed roller or the transport roller can be driven according to the rotation of the target to be driven by controlling the driving of the corresponding motor on the basis of the information detected by the first encoder or the second encoder.

As a result, the disorder in transportation of the medium can be reduced by the first driving source or the second driving source.

In the medium feeder according to a fourth aspect of the present invention, the first driving source is disposed taking a direction along the width direction as an axial direction of a motor output shaft of the first driving source, and a first transmission mechanism section which is connected to the motor output shaft which extends from a motor main body of the first driving source and transmits a power of the motor is disposed outside the motor main body in the width direction, and the first encoder is disposed inside the motor main body of the first driving source in the width direction.

According to the fourth aspect, the first driving source is disposed taking a direction along the width direction as an axial direction of the motor output shaft, and the first transmission mechanism section which is connected to the motor output shaft which extends from the motor main body and transmits a power of the motor is disposed outside the motor main body in the width direction, and the first encoder is disposed inside the motor main body of the first driving source in the width direction. Accordingly, the first encoder can be disposed in a reduced space in the width direction. As a result, the size of the apparatus in the width direction can be reduced.

In the medium feeder according to a fifth aspect of the present invention, the second driving source is disposed taking a direction along the width direction as an axial direction of a motor output shaft of the second driving source, and a second transmission mechanism section which is connected to the motor output shaft of the second driving source which extends from a motor main body of the second driving source and transmits a power of the motor is disposed outside the motor main body of the second driving source in the width direction, and the medium feeder includes: a rotation shaft provided with the transport roller; and a one-side holder which is mounted on a first end of the rotation shaft in an axial direction and in a portion in which the second driving source is positioned, and is provided with a drive gear configured to rotate the rotation shaft by a power from the second driving source via the second transmission mechanism section, wherein the first end of the rotation shaft is provided with a D-cut part having a cross section of a truncated circular shape, the one-side holder is provided with a D-cut hole having a shape corresponding to the D-cut part and allows the D-cut part to be press-fitted into the D-cut hole, and the scale of the second encoder is provided on a component other than the one-side holder and is configured to rotate integrally with the rotation shaft.

In order to achieve highly accurate transportation by the transport roller, the scale of the second encoder is preferably provided to rotate integrally with the rotation shaft.

On the other hand, if the rotation shaft engages with the one-side holder which is provided with a drive gear that rotates the rotation shaft by press-fitting the D-cut shaped first end having a cross section of a truncated circular shape into the D-cut hole of the one-side holder, there is a risk of the drive gear of the one-side holder being eccentric due to the press-fitting. As a consequence, if the scale of the second encoder is provided on the one-side holder, the scale along with the drive gear may be eccentric, leading to a risk of inaccurate detection of rotation of the rotation shaft.

According to the fifth aspect, since the scale of the second encoder is provided on a component other than the one-side holder and configured to rotate integrally with the rotation shaft, the rotation of the rotation shaft can be detected while reducing the effect of the eccentricity to thereby achieve highly accurate control of the transportation roller.

In the medium feeder according to a sixth aspect of the present invention, the scale of the second encoder is mounted on a circular press-fit holder which is mounted integrally with the rotation shaft by press-fitting the rotation shaft into the circular hole.

According to the sixth aspect, since the scale of the second encoder is mounted on the circular press-fit holder which is mounted integrally with the rotation shaft by press-fitting the rotation shaft into the circular hole, the scale of the second encoder can be mounted so as to rotate integrally with the rotation shaft while reducing the effect of the eccentricity in the one-side holder in which the rotation shaft is press-fitted into the D-cut hole.

In the medium feeder according to a seventh aspect of the present invention, the circular press-fit holder is disposed on a second end of the rotation shaft in the axial direction, which is opposed to the first end of the rotation shaft.

According to the seventh aspect, since the circular press-fit holder on which the scale of the second encoder is mounted is provided on the second end of the rotation shaft in the axial direction, which is opposed to the first end of the rotation shaft, in other words, since the one-side holder and the circular press-fit holder are provided on both sides of the rotation shaft, the size of the apparatus width can be reduced compared with the configuration in which both the one-side holder and the circular press-fit holder are provided on the same side of the rotation shaft.

In the medium feeder according to an eighth aspect of the present invention, a timing belt is use in the first transmission mechanism section or the second transmission mechanism section.

According to the eighth aspect, the power from each driving source can be transmitted while reducing an effect of the vibration from the first driving source of the second driving source.

An image reading apparatus according to a ninth aspect of the present invention includes: a reading unit that reads a medium; and the medium feeder according to any one of the first aspect to the eighth aspect that feeds the medium toward the reading unit.

According to the ninth aspect, in the image reading apparatus which includes the reading unit that reads a medium and the medium feeder that feeds the medium toward the reading unit, the same advantageous effect as that of any of the first aspect to the eighth aspect can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment 1

First, a brief outline of an image reading apparatus according to one embodiment of the present invention will be described. As an example of the image reading apparatus according to the present embodiment, a document scanner (hereinafter, simply referred to as a scanner 1) will be explained. The scanner can read at least one of a front surface and a back surface of a document, which is an example of a medium.

Figure 1:
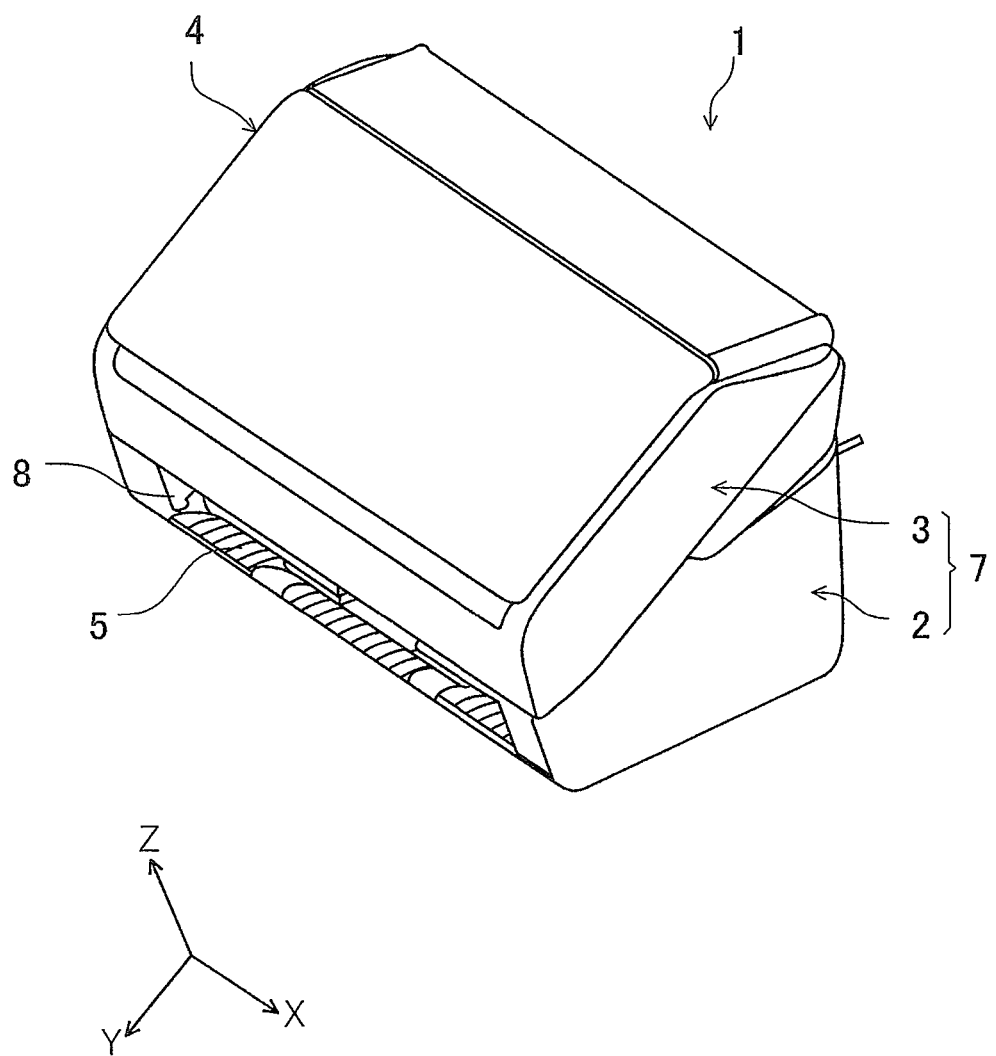
FIG. 1 is a perspective view of a scanner according to the present invention.
Figure 2:
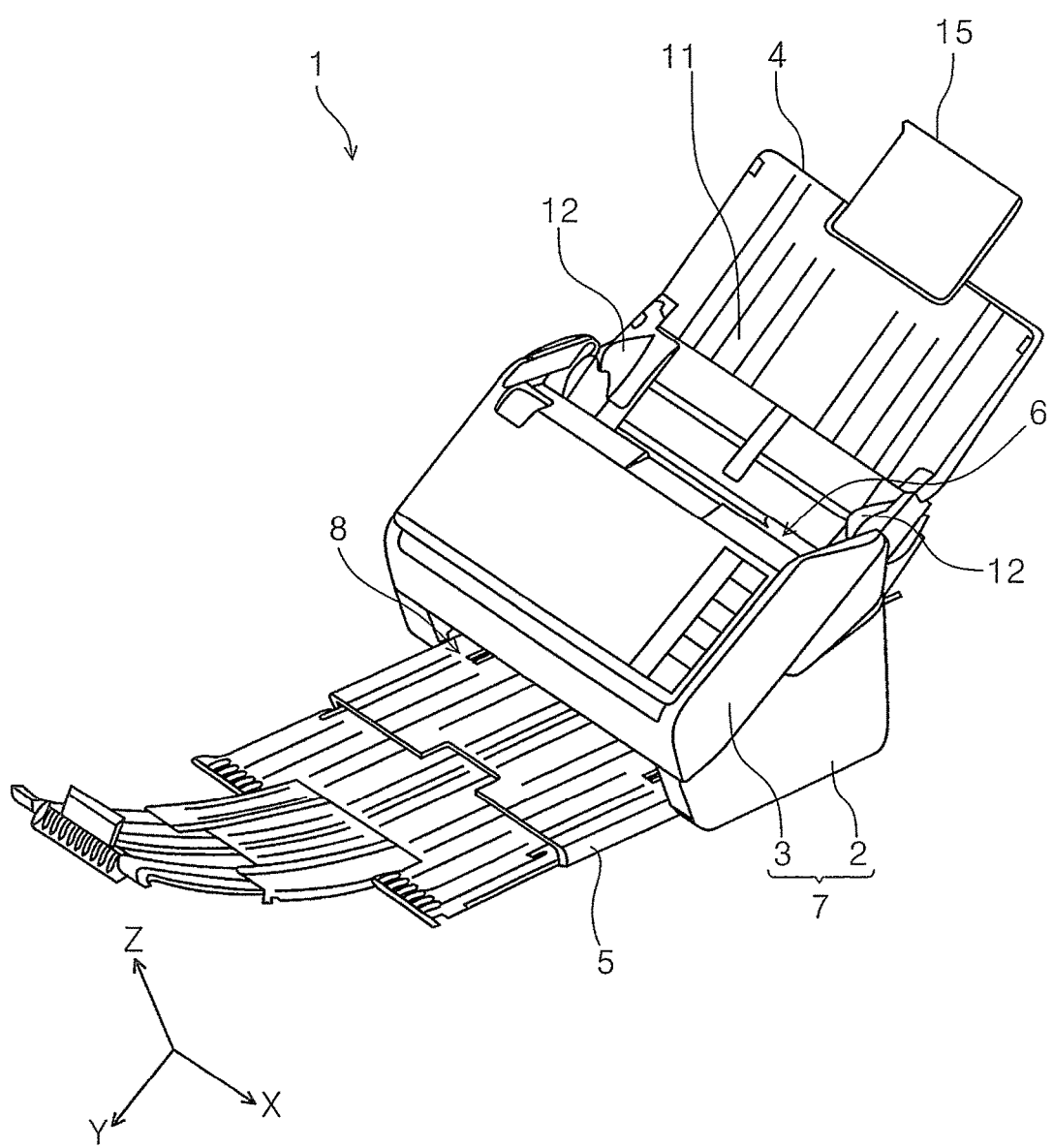
FIG. 2 is a perspective view which shows a feeding state of the scanner according to the present invention.
Figure 3:
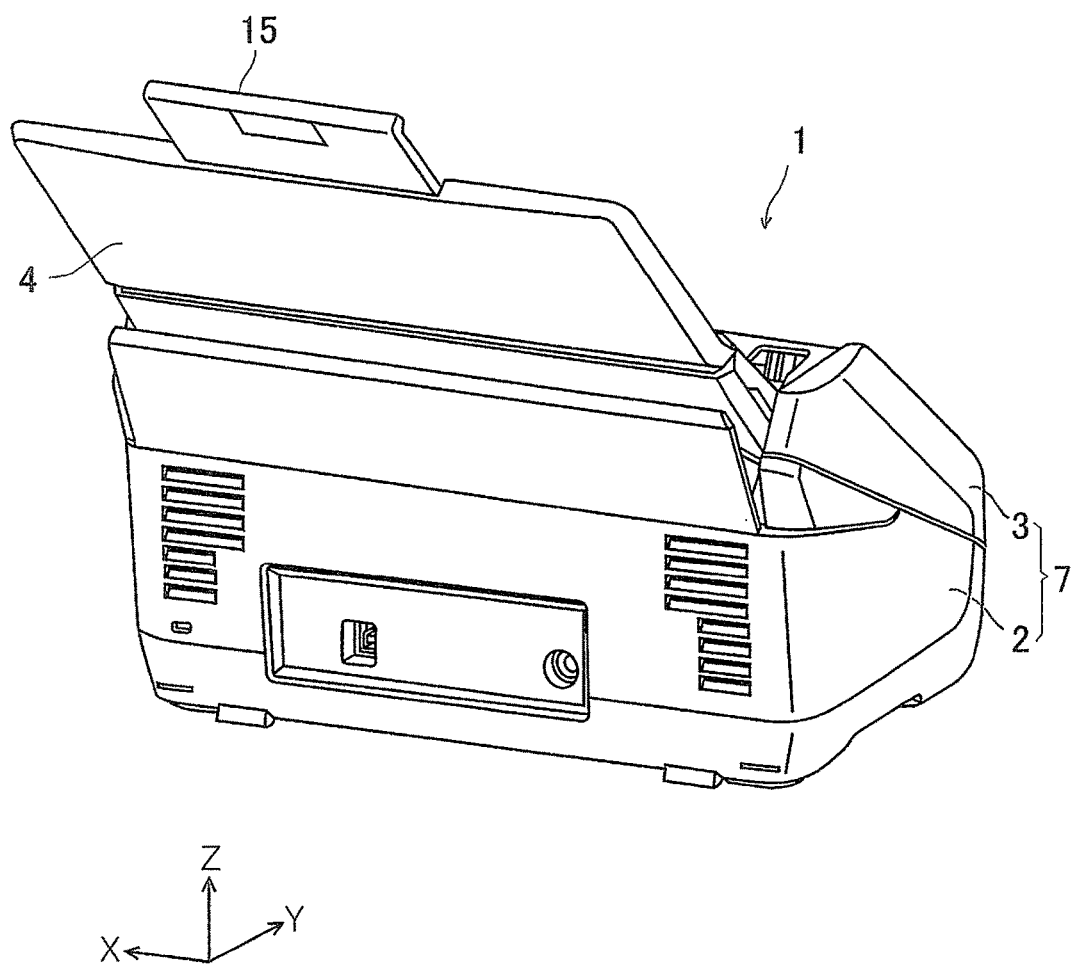
FIG. 3 is a back perspective view of the scanner shown in FIG. 2.
Figure 4:
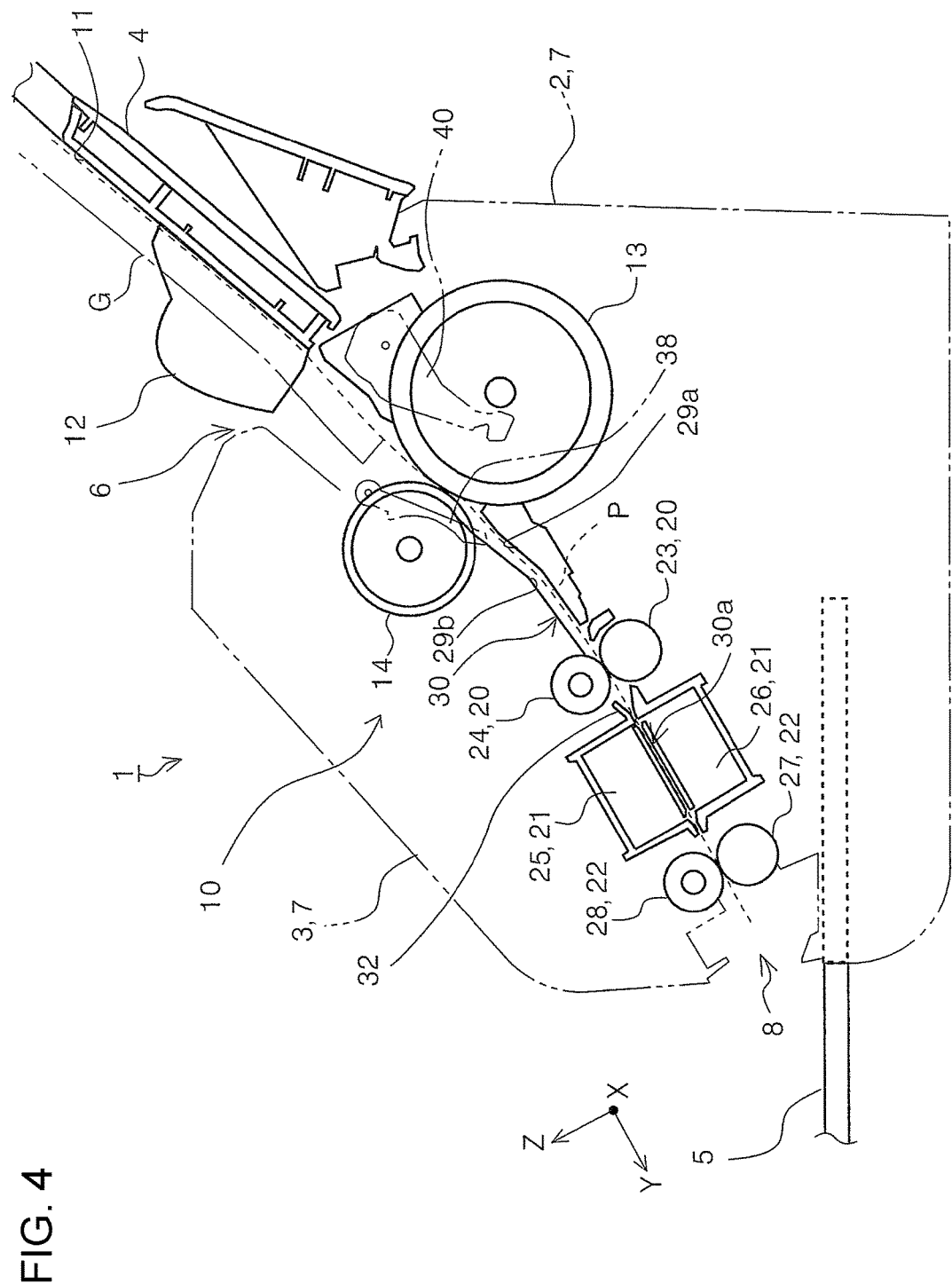
FIG. 4 is a side cross-sectional view which shows a feeding path of the scanner according to the present invention.
Figure 5:
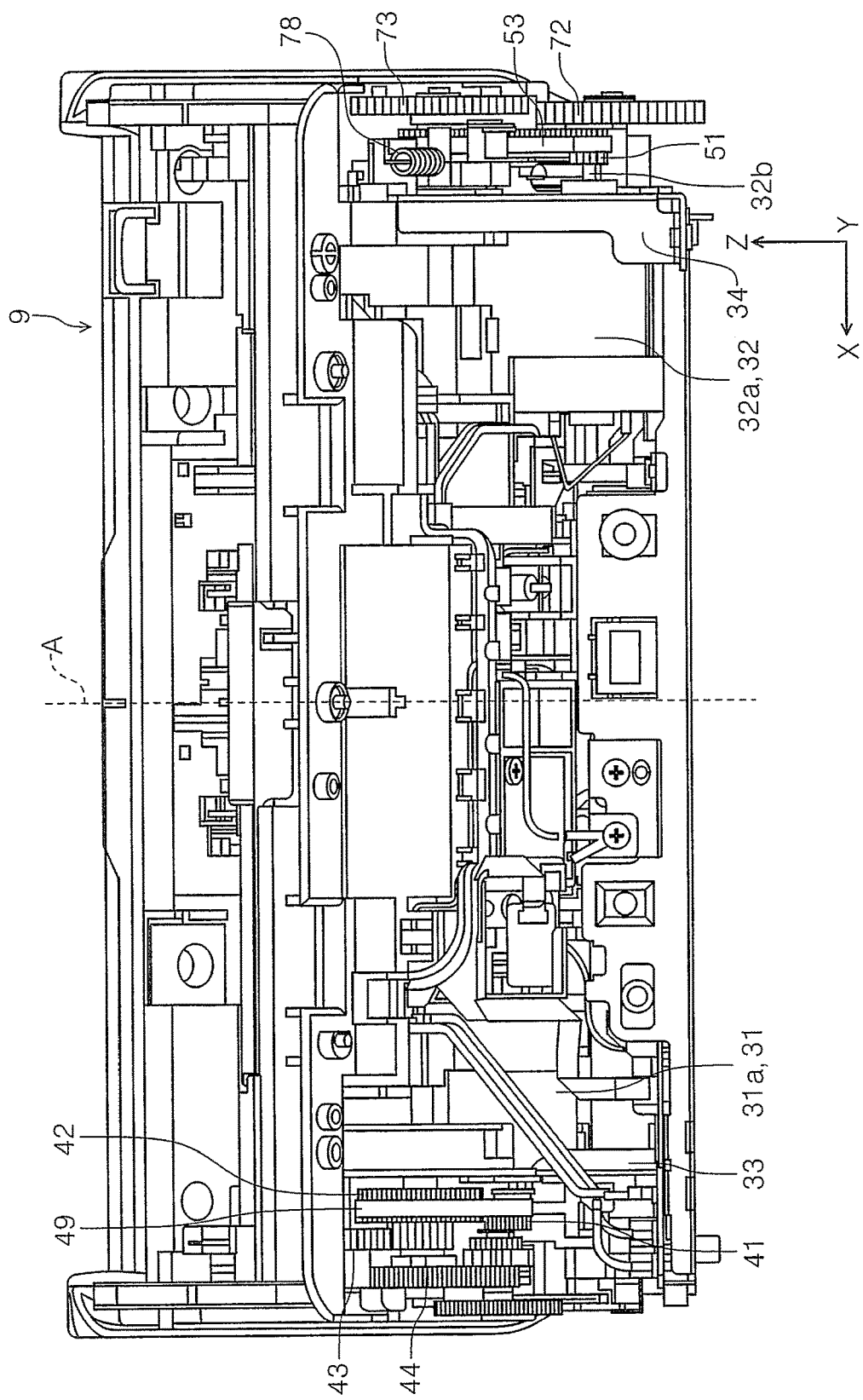
FIG. 5 is a back view of an apparatus main body of the scanner according to the present invention.
Figure 6:
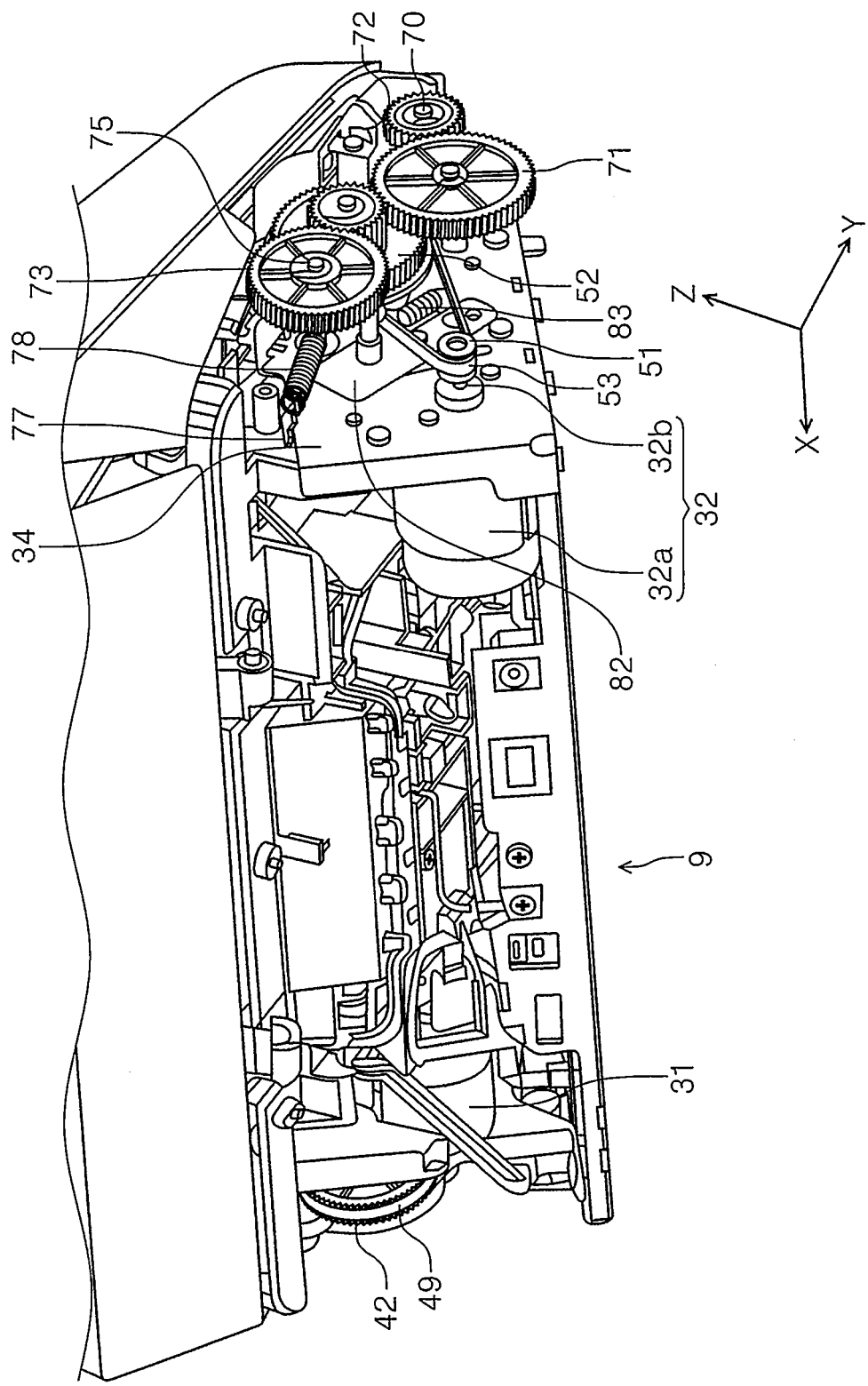
FIG. 6 is a back perspective view of a portion of the apparatus main body in which a second driving source is positioned.
Figure 7:
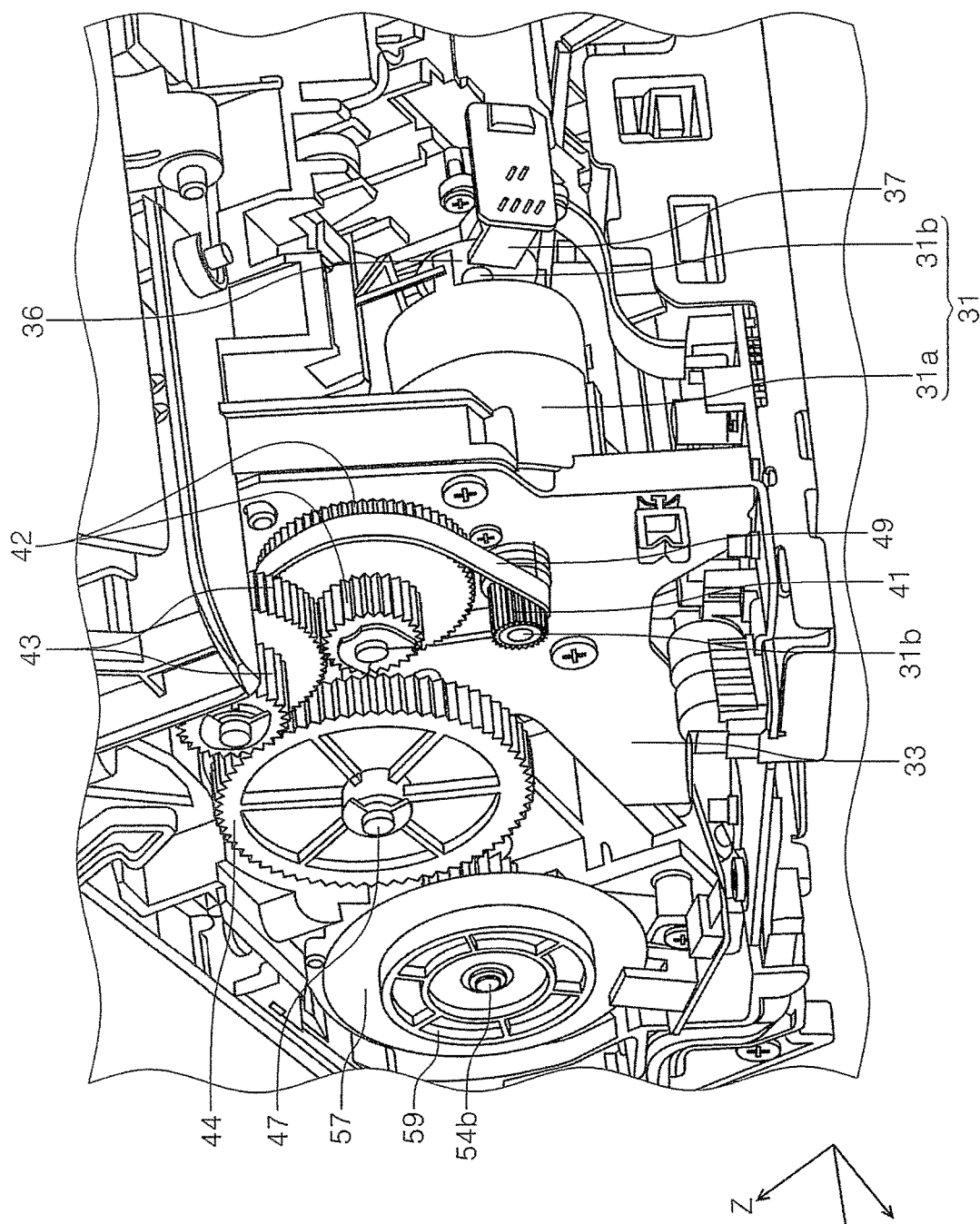
FIG. 7 is a back perspective view of a portion of the apparatus main body in which a first driving source is positioned.
Figure 8:
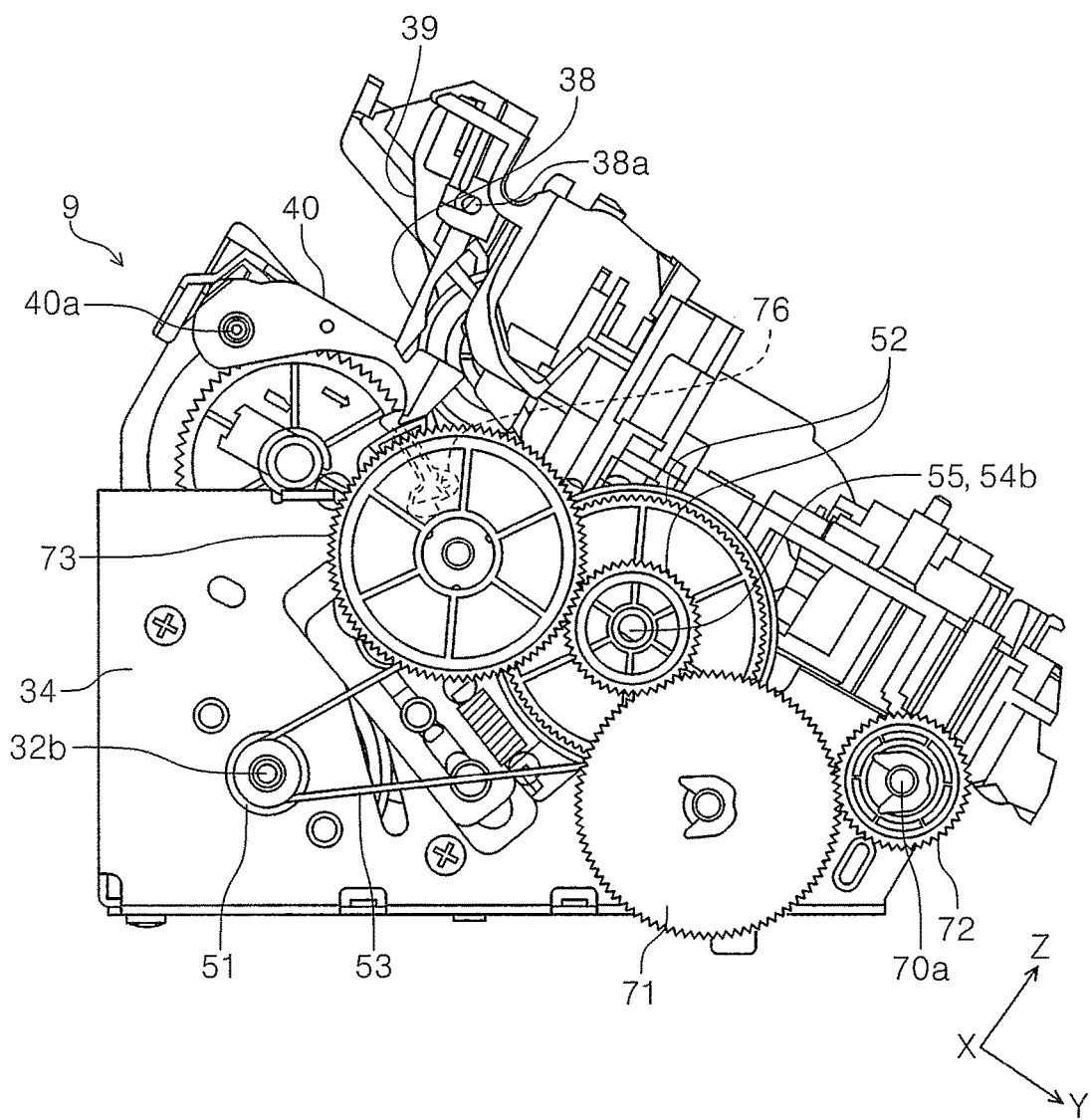
FIG. 8 is a side view of the apparatus main body.

FIG. 1 is a perspective view of the scanner according to the present invention. FIG. 2 is a perspective view which shows a feeding state of the scanner according to the present invention. FIG. 3 is a back perspective view of the scanner shown in FIG. 2. FIG. 4 is a side cross-sectional view which shows a feeding path of the scanner according to the present invention. FIG. 5 is a back view of an apparatus main body of the scanner according to the present invention. FIG. 6 is a back perspective view of a portion of the apparatus main body in which a second driving source is provided. FIG. 7 is a back perspective view of a portion of the apparatus main body in which a first driving source is provided. FIG. 8 is a side view of the apparatus main body.

Figure 9:
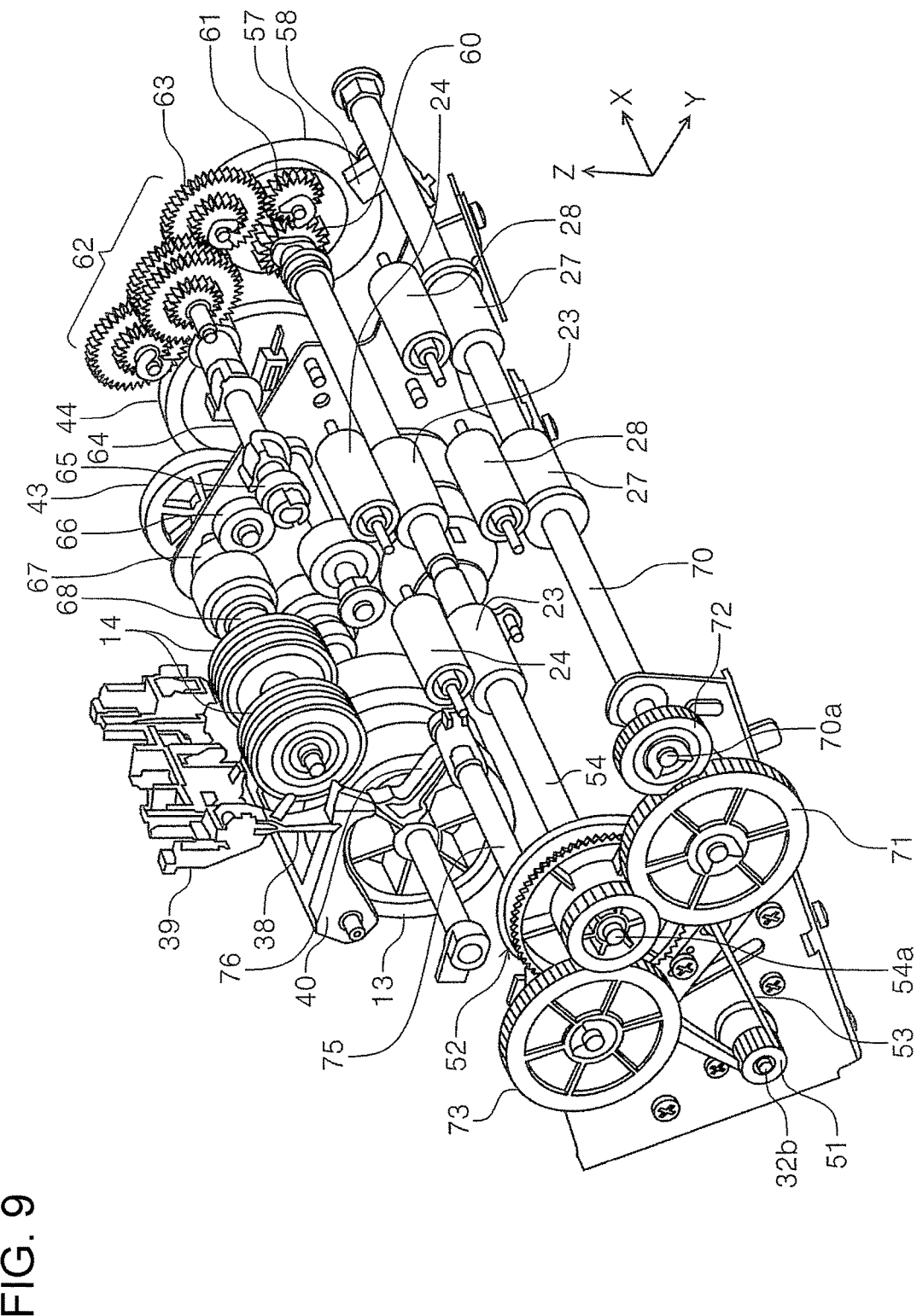
FIG. 9 is a perspective view of drive system components of the apparatus main body.
Figure 10:
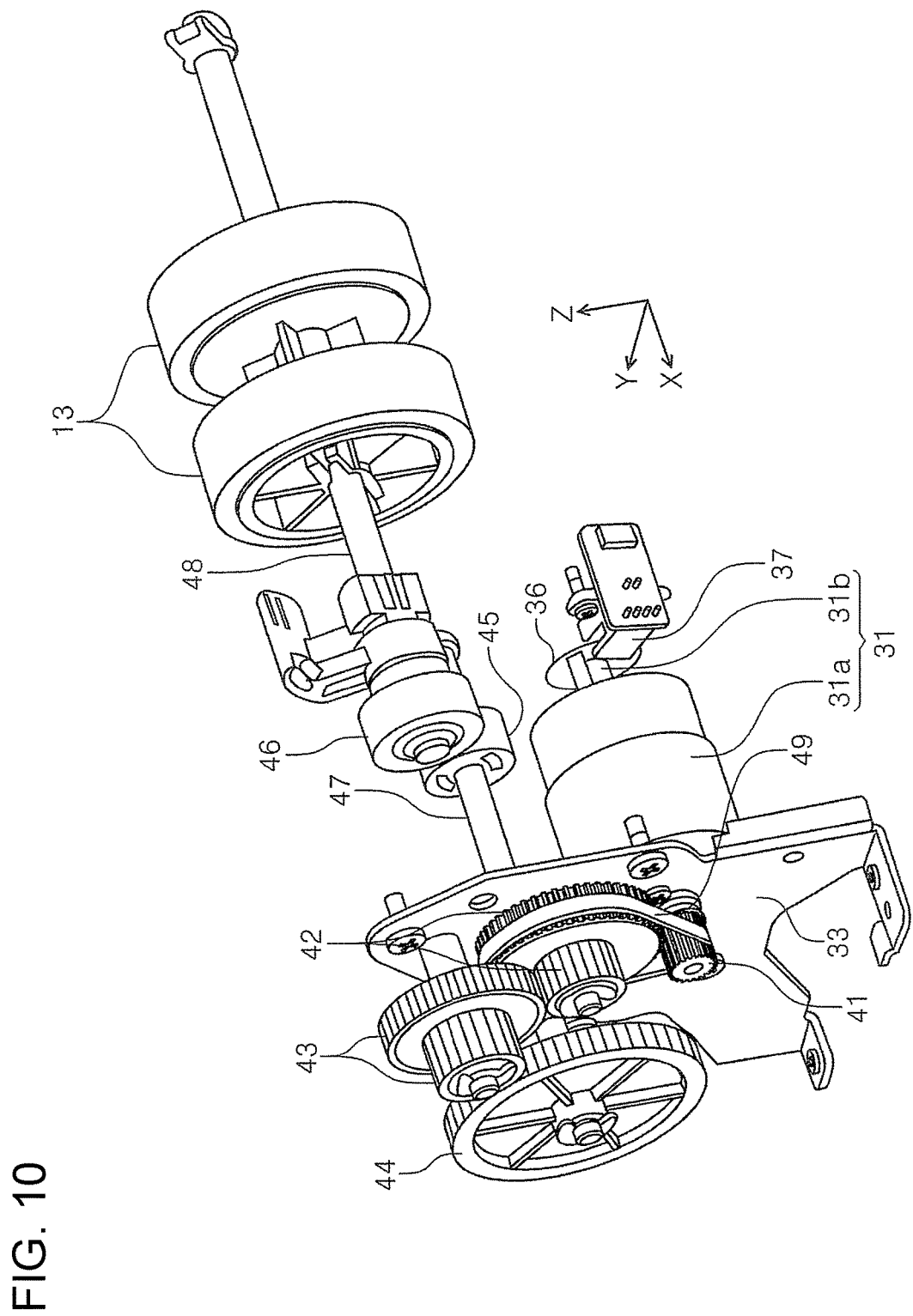
FIG. 10 is a perspective view of a driving mechanism of a feed roller.
Figure 11:
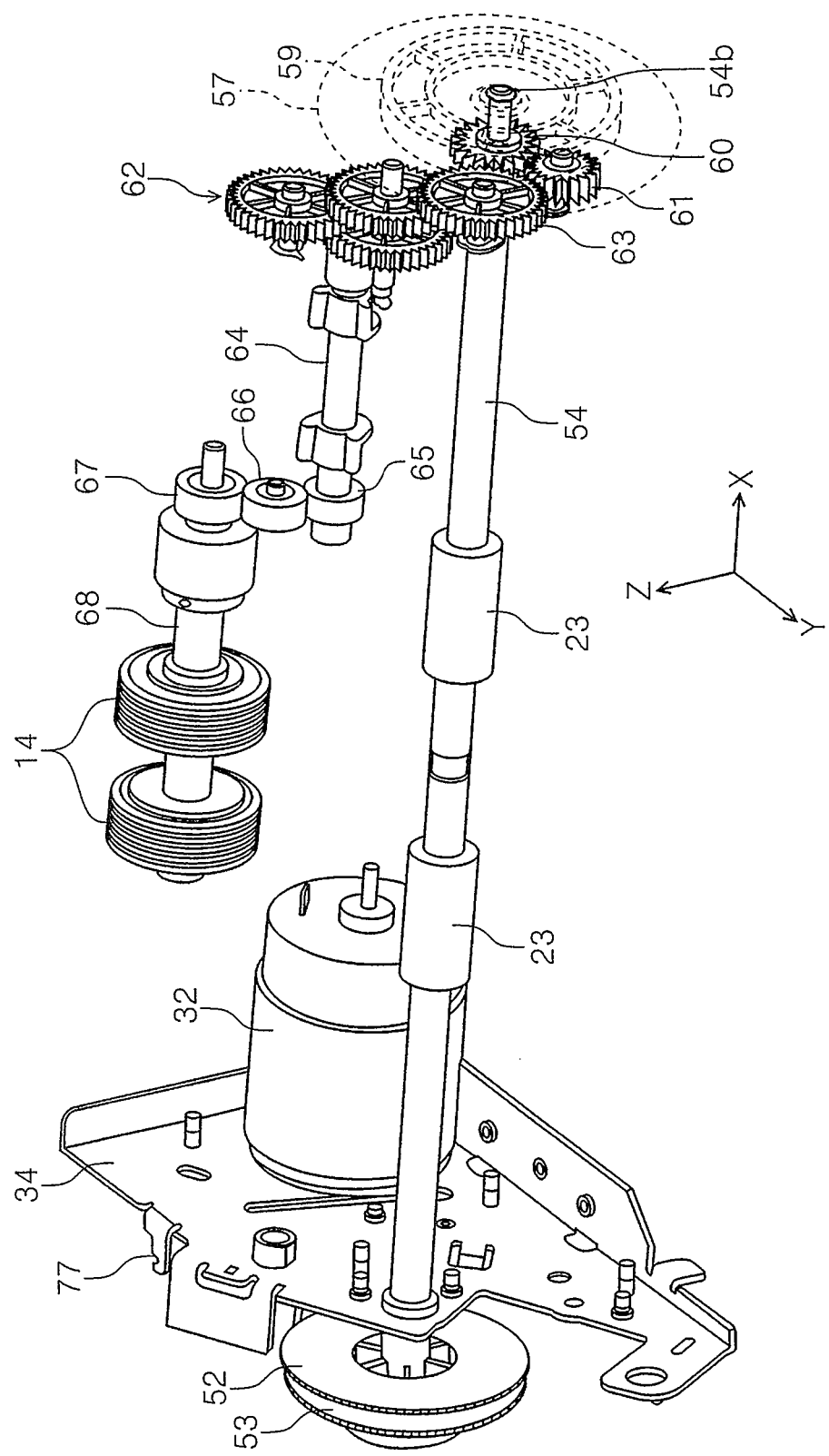
FIG. 11 is a perspective view of a driving mechanism of a separation roller.
Figure 12:
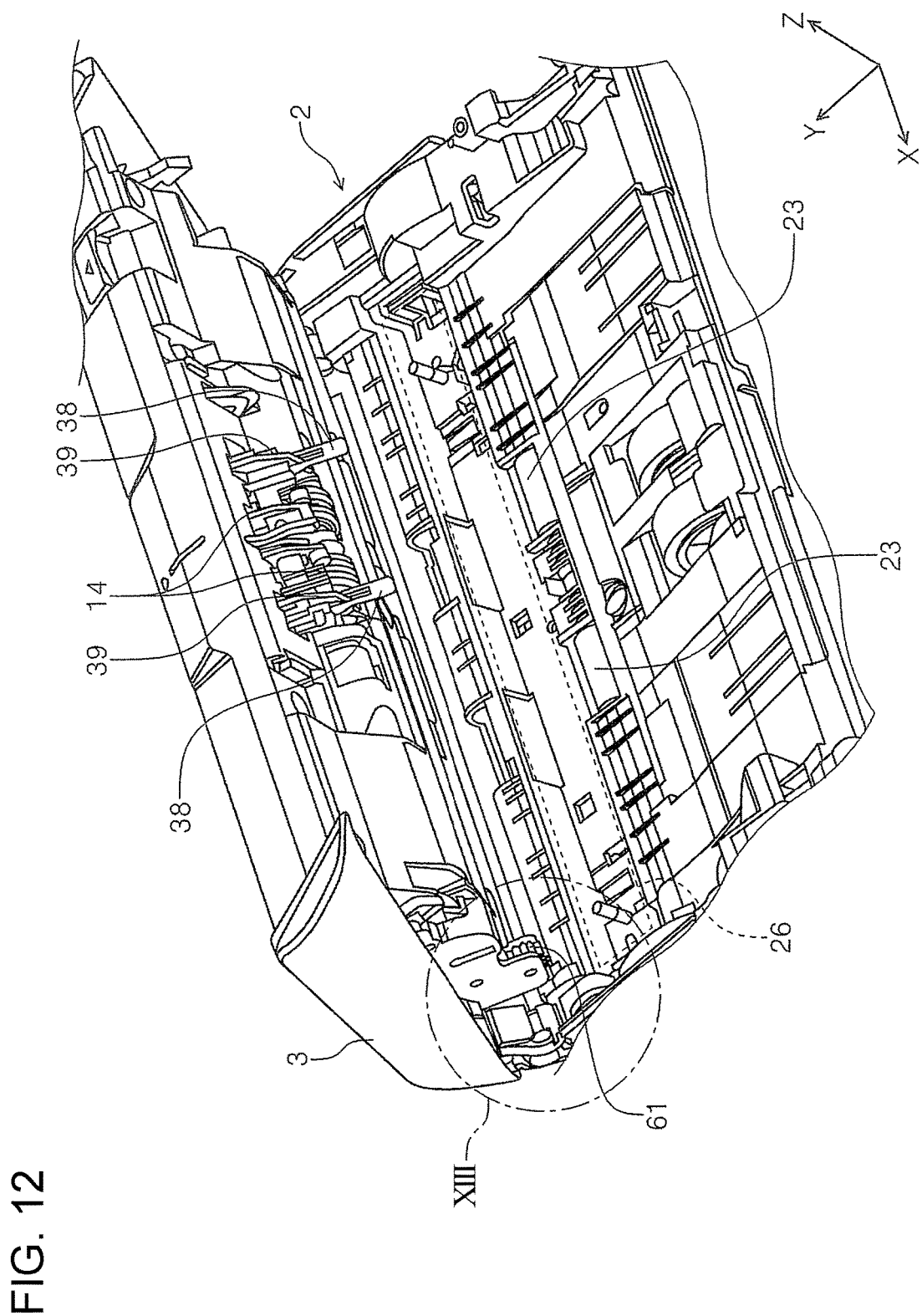
FIG. 12 is a perspective view in which an upper unit is open relative to a lower unit.
Figure 13:
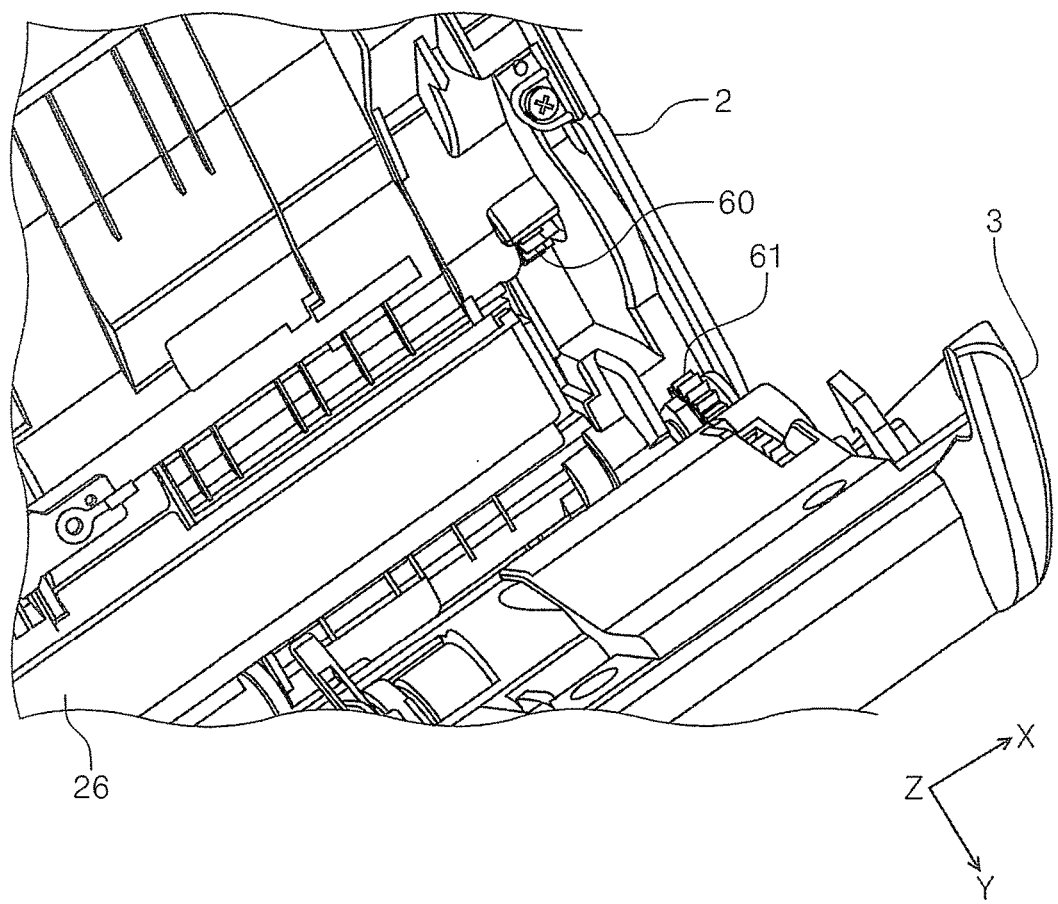
FIG. 13 is a perspective view of a section XIII shown in FIG. 12 as viewed in another angle.
Figure 14:
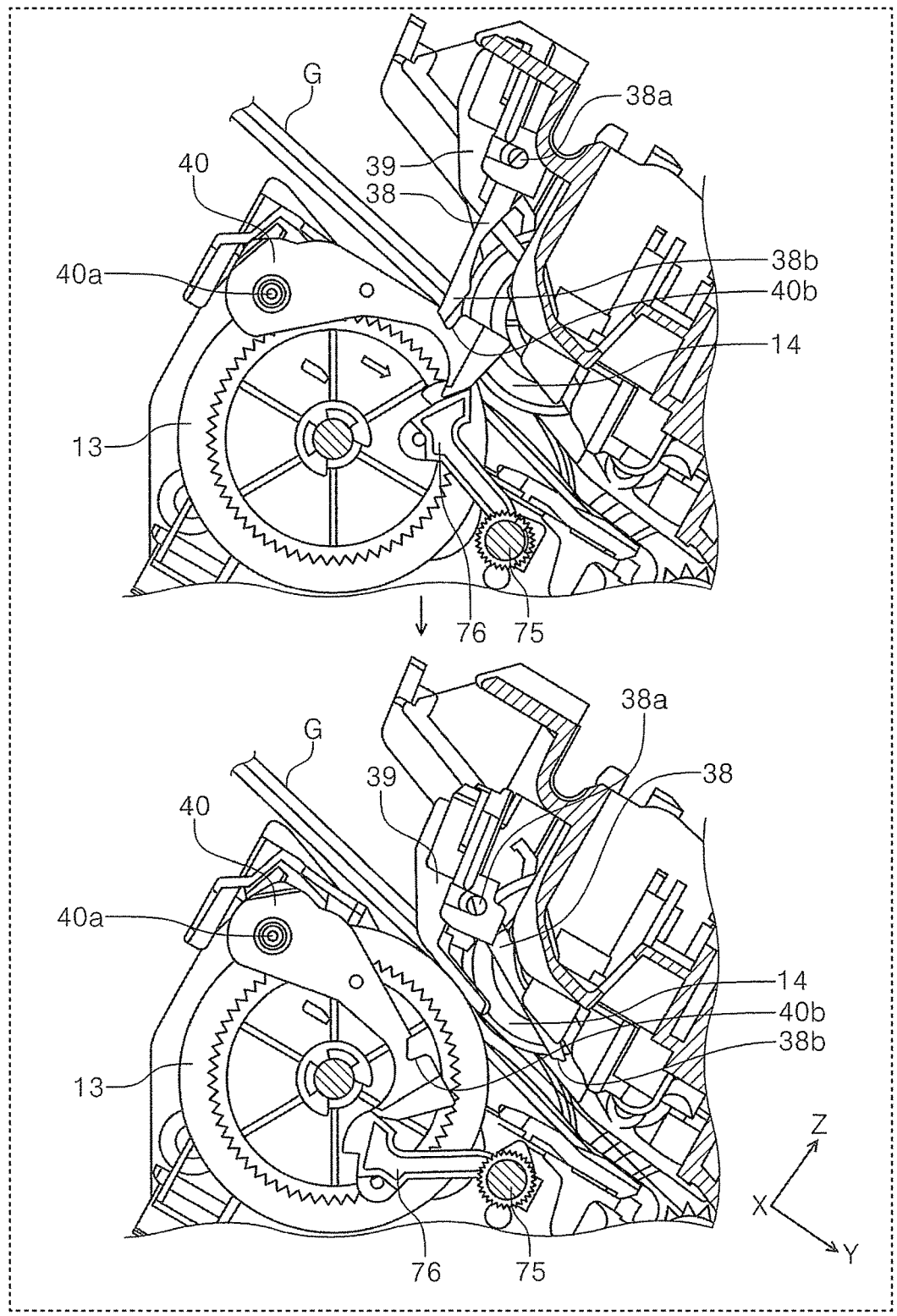
FIG. 14 is a view which illustrates an operation of a regulation unit.
Figure 15:
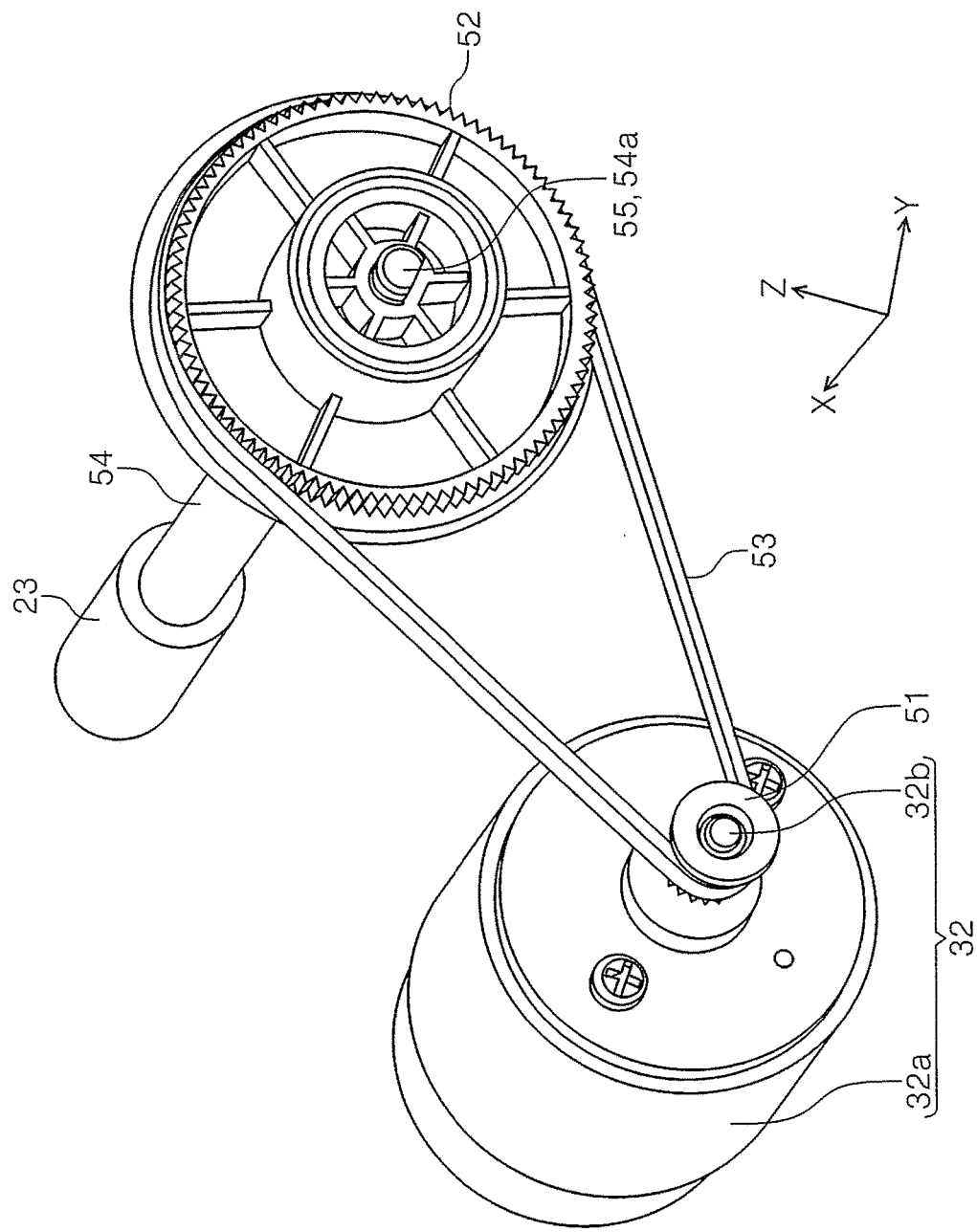
FIG. 15 is a perspective view of an eighth transmission gear.
Figure 16:
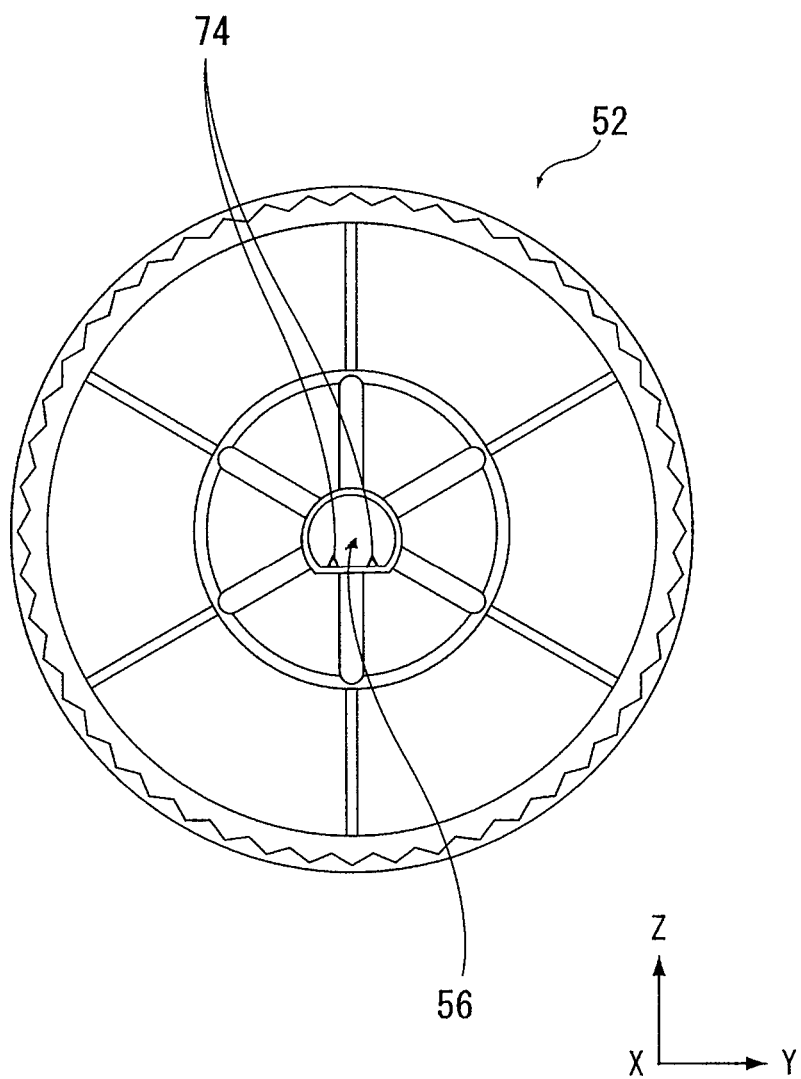
FIG. 16 is a plan view of the eighth transmission gear.
Figure 17:
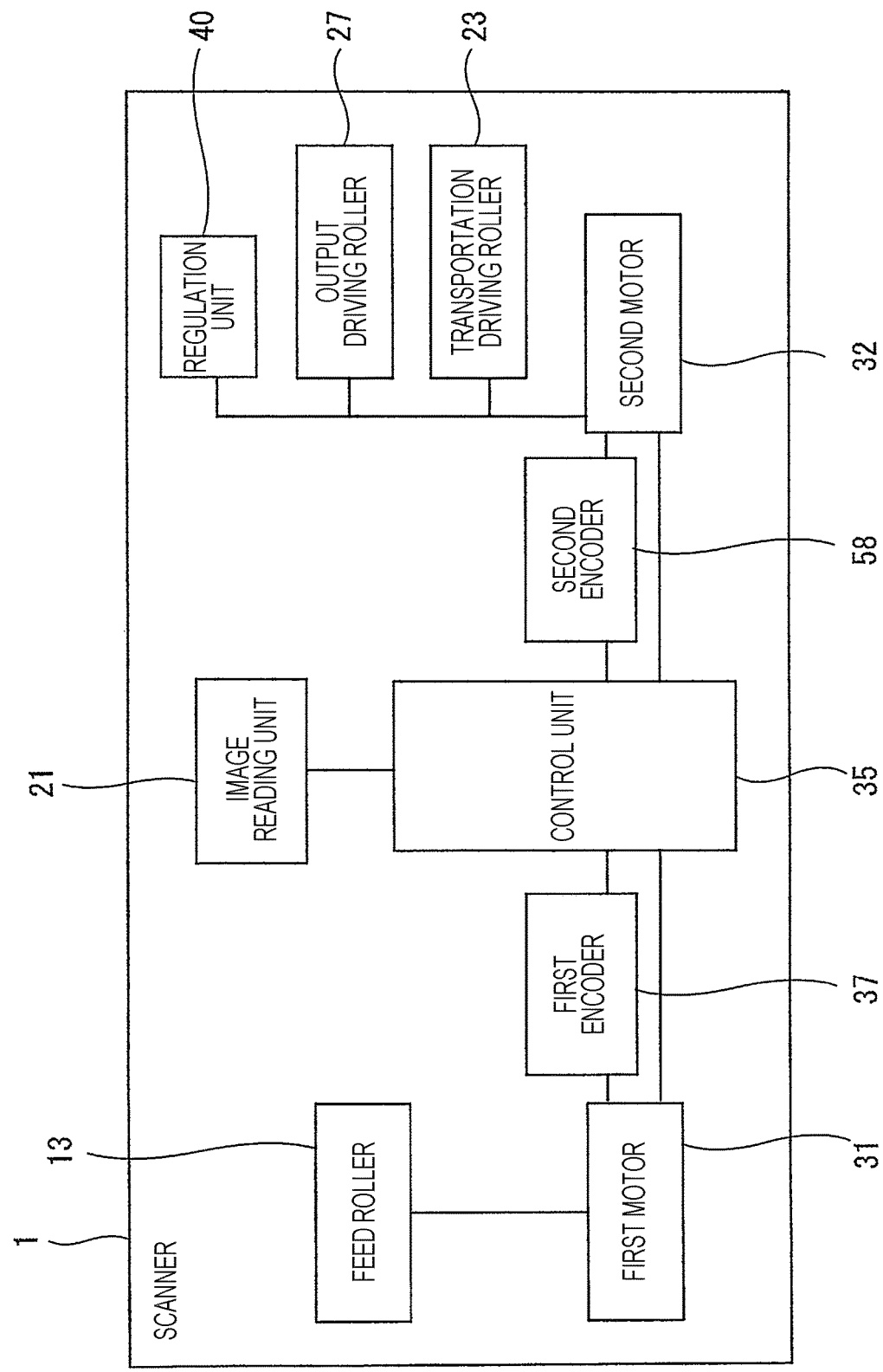
FIG. 17 is a block diagram of the scanner according to the present invention.

FIG. 9 is a perspective view of drive system components of the apparatus main body. FIG. 10 is a perspective view of a driving mechanism of a feed roller. FIG. 11 is a perspective view of a driving mechanism of a separation roller. FIG. 12 is a perspective view in which an upper unit is open relative to a lower unit. FIG. 13 is a perspective view of a section XIII shown in FIG. 12 as viewed in another angle. FIG. 14 is a view which illustrates an operation of a regulation unit. FIG. 15 is a perspective view of an eighth transmission gear. FIG. 16 is a plan view of the eighth transmission gear. FIG. 17 is a block diagram of the scanner according to the present invention.

Outline of Scanner

The scanner 1 (FIG. 1) which is an image reading apparatus according to the present invention includes a housing 7 which constitutes part of the outer appearance of the apparatus, and an apparatus main body 9 disposed in the housing 7. The apparatus main body 9 includes a medium feeder 10 which is one embodiment of a "medium feeder" according to the present invention, and an image reading unit 21 (FIG. 4) that reads an image of a document fed from the medium feeder 10.

The housing 7 is made up of a lower unit 2 which constitutes a lower part of the housing 7 and an upper unit 3 which is openable relative to the lower unit 2.

The X-Y-Z coordinate system is shown in each drawing, in which the X direction is an apparatus width direction and a paper sheet width direction, and the Y direction is a paper sheet transportation direction. The Z direction is a direction which intersects with the Y direction, and generally indicates a direction perpendicular to the surface of the paper sheet transported. Further, the +Y direction is defined as an apparatus front side, and the −Y direction is defined as an apparatus back side. As viewed from the apparatus front side, the right side is defined as the +X direction, and the left side is defined as the −X direction. Further, the apparatus upper side (including the upper part, top surface and the like) is defined as the +Z direction, and the apparatus lower side (including the lower part, bottom surface, and the like) is defined as the −Z direction.

In the scanner 1, the paper sheet P which is a medium is transported in the +Y direction in each drawing. In the following description, the direction (+Y direction) in which the paper sheet P is transported is referred to as a "downstream," and a direction opposite from the +Y direction (−Y direction) is referred to as an "upstream."

The upper unit 3 is mounted on the lower unit 2 so as to be pivotable relative to the lower unit 2 about a pivot located on the downstream side (+Y side) in the paper sheet transportation direction. The upper unit 3 can assume a closed state (see FIG. 2) in which the upper unit 3 is closed to the lower unit 2 so as to form a paper sheet transportation path for the paper sheet P together with the lower unit 2, and an open state (see FIG. 12) in which the upper unit 3 is rotated relative to the lower unit 2 toward the apparatus front side so as to expose the paper sheet transportation path for the paper sheet P to thereby facilitate a maintenance operation such as removal of a paper jam of the paper sheet P.

A paper support 4 is provided on the upper side of the upper unit 3 so as to be openable relative to the upper unit 3. The paper support 4 is a "medium support" which supports a document which is an example of a medium (hereinafter, also referred to as a "paper sheet P") when in the open state (see FIG. 2).

The paper support 4 can assume a non-feeding state in which the paper support 4 closes the upper part of the upper unit 3 and a feeding port 6 (FIG. 2) as shown in FIG. 1, and a feeding state in which the paper support 4 has been rotated from the non-feeding state shown in FIG. 1 to the apparatus back side as shown in FIG. 2 to thereby open the feeding port 6 and allow the paper sheet P to be set on the backside of the paper support 4 (a medium loading section 11 for the paper sheet P).

Moreover, an auxiliary paper support 15 (FIG. 2, FIG. 3) is disposed upstream relative to the paper support 4. The auxiliary paper support 15 is configured to be housed and pulled out from a hollow-shaped paper support 4. The auxiliary paper support 15 can be pulled out to support the paper sheet P having a length elongated in the transportation direction.

An output port 8 is provided on the apparatus front side of the lower unit 2 so that the paper sheet P is outputted therethrough. Further, the lower unit 2 includes a paper output tray 5 that can be pulled out from the output port 8 so as to protrude from the apparatus front side. The paper output tray 5 can assume a state of being housed in a bottom of the lower unit 2 (see FIG. 1), and a state of being pulled out from the apparatus front side (see FIG. 2). Further, in the present embodiment, the paper output tray 5 is configured by connecting a plurality of tray members and can be adjusted in length pulled out from the output port 8 depending on the length of the paper sheet P to be outputted.

Feeding Path in Scanner

Next, with reference to FIG. 4, a paper sheet transportation path in the scanner 1 will be described.

The paper sheet P to be set in the feeding port 6 is loaded on the medium loading section 11. A plurality of paper sheets P can be set in the feeding port 6.

In FIG. 4, the reference numeral 12 denotes a pair of edge guides (see also FIG. 2) that guides the both side edges of the paper sheet P in the width direction (X axis direction). The edge guide 12 is provided so as to be slidable in the X axis direction depending on the size of the paper sheet P.

The paper sheet P set in the feeding port 6 is fed by the medium feeder 10 to the image reading unit 21, which will be described later. The medium feeder 10 includes a feed roller 13 that feeds the paper sheet P loaded on the medium loading section 11, and a transport roller 20 which is disposed downstream relative to the feed roller 13. Further, a driving mechanism of the medium feeder 10 will be described later.

A separation roller 14 is disposed at a position opposed to the feed roller 13 so as to cooperate with the feed roller 13 to nip the paper sheet P therebetween for separation of the paper sheet P.

Moreover, the outer peripheral surfaces of the feed roller 13 and the separation roller 14 are made of a high friction material (for example, elastomer such as rubber).

The paper sheet P is picked up by the feed roller 13 which is disposed to be rotatable relative to the lower unit 2 and fed in the downstream direction (+Y direction). Specifically, the feed roller 13 rotates while being in contact with the surface of the paper sheet P which faces the surface of the medium loading section 11 on which the paper sheet P is loaded to thereby feed the paper sheet P in the downstream direction. Accordingly, when the plurality of paper sheets P are set in the feeding port 6 of the scanner 1, the lowermost sheet is successively fed in the downstream direction.

In FIG. 4, the reference character G denotes a bundle of paper sheets loaded on the medium loading section 11. The leading edge of the bundle of paper sheets G is held by a flap 38 at a feeding standby position (the position shown in FIG. 4) before the start of feeding so as not to enter between the feed roller 13 and the separation roller 14. The flap 38 is disposed on a pressing unit 39 (FIG. 8).

The pressing unit 39 is advanced to press the paper sheets P loaded on the medium loading section 11 toward the feed roller 13.

A regulation unit 40 is disposed around the feed roller 13. The regulation unit 40 is configured to switch a regulation state in which the pressing unit 39 is regulated from being advanced toward the feed roller 13 and a permission state in which the pressing unit 39 is permitted to be advanced toward the feed roller 13.

Before the start of feeding, the bundle of documents G is supported from the underside and pushed up by the regulation unit 40 positioned in the regulation state so as to be separated from the feed roller 13. That is, the bundle of documents G is prevented from being in contact with the feed roller 13. A driving mechanism of the regulation unit 40 will be described in detail later.

Once the feeding of the document starts, the regulation unit 40 is set back downward so that the lowermost sheet of the bundle of documents G comes into contact with the feed roller 13 and the flap 38 becomes a state ready to pivot (a state ready to change the position). Accordingly, as the feed roller 13 rotates, the lowermost document is fed in the downstream direction. The flap 38 pivots in the downstream direction by the document fed in the downstream direction, and assumes a position that opens the medium feeding path.

A transport roller 20 is disposed downstream relative to the feed roller 13. The transport roller 20 is composed of a transportation driving roller 23 disposed in the lower unit 2, and a transportation driven roller 24 disposed in the upper unit 3 and is rotated by the transportation driving roller 23.

The paper sheet P fed by the feed roller 13 is transported in a transportation path 30 which is formed of guiding surfaces facing each other. Of the guiding surfaces facing each other, the surface that supports the paper sheet P from the underside is referred to as a lower guiding surface 29a, and a surface which faces the lower guiding surface 29a is referred to as an upper guiding surface 29b.

Moreover, the feed roller 13 and the transportation driving roller 23 are disposed so as to partially protrude toward the lower guiding surface 29a.

The image reading unit 21 which is a "reading unit" that reads an image is disposed downstream relative to the transport roller 20, and the paper sheet P is transported to the image reading unit 21 by the transport roller 20.

The image reading unit 21 includes an upper image reading sensor 25 disposed in the upper unit 3 and a lower image reading sensor 26 disposed in the lower unit 2. In this embodiment, the upper image reading sensor 25 and the lower image reading sensor 26 are illustrated as a contact image sensor module (CISM).

In the image reading unit 21, after an image on at least one of the front surface and the back surface of the paper sheet P is read, the paper sheet P is fed by an output roller 22 which is disposed downstream relative to the image reading unit 21 and is outputted through the output port 8 which is disposed on the apparatus front side of the lower unit 2. The output roller 22 is composed of an output drive roller 27 disposed in the lower unit 2, and an output driven roller 28 disposed in the upper unit 3 and is rotated by the output drive roller 27.

The paper sheet P outputted through the output port 8 is loaded on the paper output tray 5 in the state of being pulled out.

Medium Feeder

Next, the above-mentioned medium feeder 10 will be further described in detail.

First, the medium feeder 10 (FIG. 5, FIG. 6) includes two driving sources, that is, a first motor 31 which is a "first driving source" that drives the feed roller 13 and a second motor 32 which is a "second driving source" that drives the transport roller 20. The first motor 31 and the second motor 32 are disposed in the housing 7 as with the feed roller 13 and the transport roller 20.

As shown in FIG. 5, the first motor 31 and the second motor 32 are disposed on both sides of a center region A of the lower unit 2 in the width direction (X axis direction) which is perpendicular to the medium transportation direction (Y axis direction).

Since the two driving sources (the first motor 31 and the second motor 32) are disposed on both sides of the center region of the lower unit in the apparatus width direction as described above, the scanner 1 having the medium feeder 10 can be well balanced in weight.

In addition, since both the first motor 31 and the second motor 32 are disposed in the lower unit 2, the housing 7 can remain stable when the upper unit 3 is open relative to the lower unit 2. As described above, the scanner 1 can be disposed in a stable manner.

Next, the driving mechanism of the medium feeder 10 will be described.

First, the driving mechanism of the feed roller 13 driven by the first motor 31 will be described.

In this embodiment, the first motor 31 is a DC motor, and is made up of a motor main body 31a and a motor output shaft 31b which extends from the motor main body 31a as shown in FIG. 10. The first motor 31 is disposed taking an apparatus width direction (X axis direction) as an axial direction of the motor output shaft 31b of the first motor 31.

The first motor 31 is provided with the motor main body 31a fixed to a right side frame 33 (FIG. 7) which is disposed on the right side (+X side) as viewed from the apparatus front side. Further, a left side frame 34 (FIG. 6) is disposed on the left side (−X side) as viewed from the apparatus front side.

The motor output shaft 31b of the first motor 31 is connected to a first transmission gear 41 which is a "first transmission mechanism section" that transmits a power of the motor to the feed roller 13. The first transmission gear 41 is mounted at a position on the outside (+X side) of the motor main body 31a in the apparatus width direction. In this embodiment, the first transmission gear 41 is located outside the right side frame 33 (see FIG. 7 and FIG. 10).

As shown in FIG. 7, the power of the first motor 31 is transmitted from the first transmission gear 41 to a second transmission gear 42 via a timing belt 49. The second transmission gear 42 engages with a third transmission gear 43, and the third transmission gear 43 engages with a fourth transmission gear 44. A rotation shaft 47 of the fourth transmission gear 44 extends inside the right side frame 33 (between the right side frame 33 and the left side frame 34), and a fifth transmission gear 45 is provided on the −X side end of the rotation shaft 47 located inside the right side frame 33 (FIG. 10).

The fifth transmission gear 45 shown in FIG. 10 engages with a sixth transmission gear 46 which is disposed on the +X side end of the rotation shaft 48 of the feed roller 13. A train of these gears transmits the power of the first motor 31 to the feed roller 13.

In this embodiment, during transmission of the power from the first transmission gear 41 mounted on the motor output shaft 31b of the first motor 31 to the second transmission gear 42, the power can be transmitted while reducing an effect of the vibration from the first motor 31 due to being transmitted via the timing belt 49.

Further, the first motor 31 includes a first scale 36 that rotates by driving the first motor 31, and a first encoder 37 that detects a rotation amount of the first scale 36. The scanner 1 includes a control unit 35 (FIG. 17), and the control unit 35 is configured to control the driving of the first motor 31 on the basis of the information detected by the first encoder 37. Since the driving of the first motor 31 is controlled on the basis of the information detected by the first encoder 37, the feed roller 13 can be driven according to the rotation of the target to be driven to thereby reduce the disorder in transportation of the paper sheet.

Here, the first encoder 37 is disposed on the inside (−X side) of the motor main body 31a of the first motor 31 in the apparatus width direction. In this embodiment, the first encoder 37 is disposed inside the right side frame 33. Accordingly, the first encoder 37 can be disposed in a reduced space in the apparatus width direction, thereby reducing the size of the scanner 1 in the width direction.

Next, the driving mechanism by the second motor 32 will be described. In this embodiment, the second motor 32 is a driving source of the transportation driving roller 23 that constitutes the transport roller 20.

The second motor 32 is a DC motor as the first motor 31, and is made up of a motor main body 32a and a motor output shaft 32b which extends from the motor main body 32a as shown in FIG. 6. The second motor 32 is disposed taking an apparatus width direction (X axis direction) as an axial direction of the motor output shaft 32b of the second motor 32.

The second motor 32 is provided with the motor main body 32a fixed to a left side frame 34 (FIG. 11) which is disposed on the left side (−X side) as viewed from the apparatus front side.

The motor output shaft 32b of the second motor 32 is connected to a seventh transmission gear 51 which is a "second transmission mechanism section" that transmits the power of the motor. The seventh transmission gear 51 is mounted at a position on the outside (−X side) of the motor main body 32a in the apparatus width direction. In this embodiment, the seventh transmission gear 51 is located outside the left side frame 34.

The power of the second motor 32 is configured to be transmitted from the seventh transmission gear 51 which is disposed on the motor output shaft 32b to an eighth transmission gear 52 via a timing belt 53. In the second motor 32, during transmission of the power from the seventh transmission gear 51 to the eighth transmission gear 52, the power can also be transmitted while reducing an effect of the vibration from the second motor 32 due to being transmitted via the timing belt 53.

Figure 18:
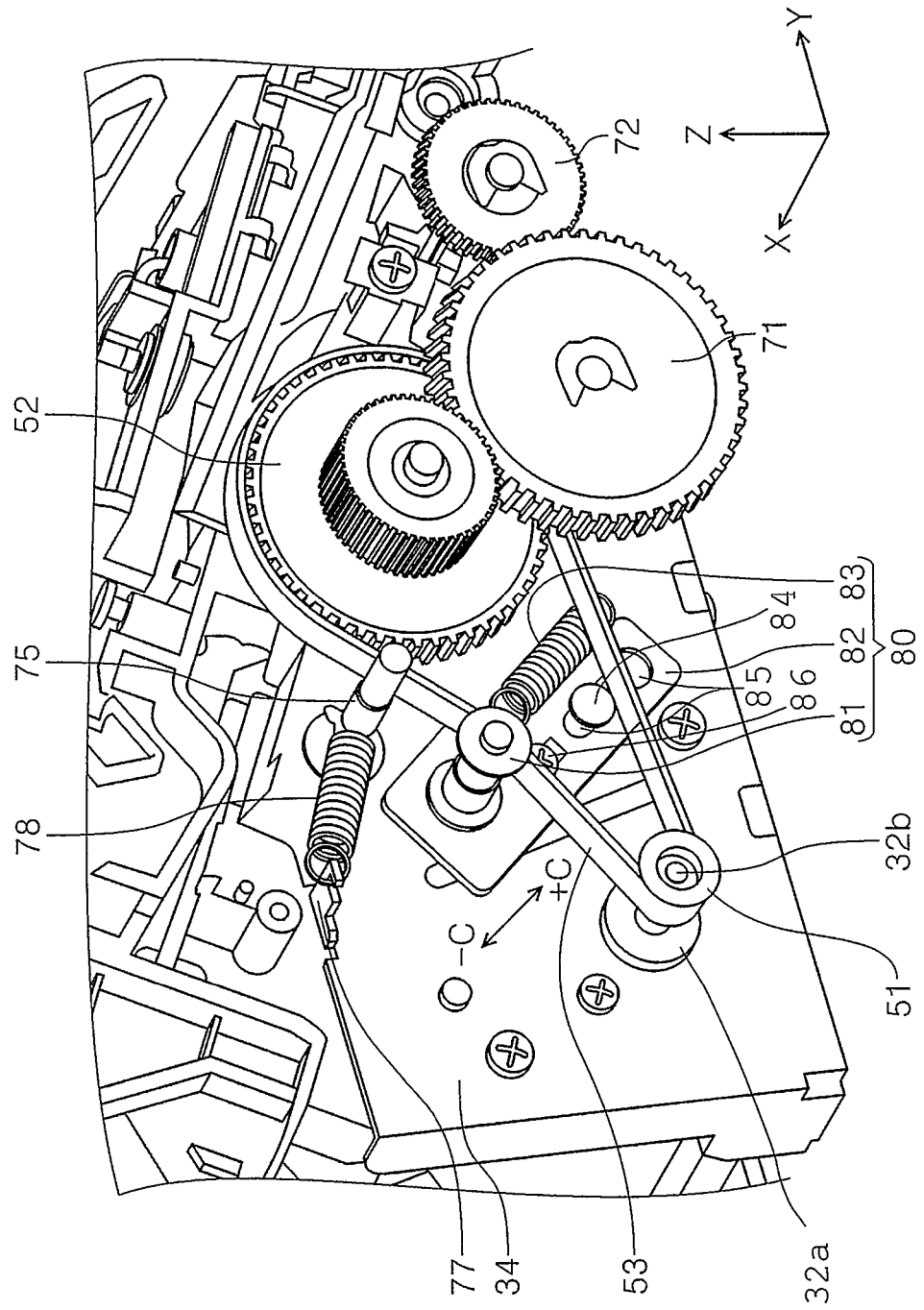
FIG. 18 is a perspective view of a portion of the apparatus main body in which the second driving source is positioned, showing that a seventeenth transmission gear is removed.

The timing belt 53 is configured such that a predetermined tension is imparted by a belt tension mechanism 80 (FIG. 18). The belt tension mechanism 80 includes a driven pulley 81 which can be rotated by the rotating timing belt 53, a pulley holder 82 that supports the driven pulley 81 and is movable in the directions of the two-direction arrow indicated by the +C and −C in FIG. 18, and a tension spring 83 which is a bias member that imparts tension to the timing belt 53. The driven pulley 81 is pulled by the tension spring 83 in the +C direction to thereby impart tension to the timing belt 53.

Further, a boss 84 is provided on the left side frame 34, and a groove 85 is formed in the pulley holder 82 so that the boss 84 is inserted into to the groove 85 to thereby allow the pulley holder 82 to be guided in the directions of the two-direction arrow indicated by the +C and −C. Moreover, the pulley holder 82 is configured to be fixed at a mount position by a screw 86.

The eighth transmission gear 52 is a drive gear that rotates the rotation shaft 54 by the power transmitted from the second motor 32 via the seventh transmission gear 51. The eighth transmission gear 52 is mounted on a first end (−X side end 54a) of the rotation shaft 54 of the transportation driving roller 23 so that the power of the second motor 32 is transmitted to the transportation driving roller 23.

In other words, the eighth transmission gear 52 is a "one-side holder" of the rotation shaft 54 which is mounted on the first end 54a of the rotation shaft 54 of the transportation driving roller 23 as viewed in the axial direction and in a portion in which the second motor 32 is positioned.

The first end 54a of the rotation shaft 54 has a D-cut part 55 (FIG. 15) having a cross section of a truncated circular shape, and the eighth transmission gear 52 which is a "one-side holder" has a D-cut hole 56 (FIG. 16) having a shape corresponding to the D-cut part 55 so that the D-cut part 55 is press-fitted therein. Since the rotation shaft 54 is mounted on the eighth transmission gear 52 by press-fitting the D-cut part 55 of the rotation shaft 54 into the D-cut hole 56 of the eighth transmission gear 52, co-rotation of the eighth transmission gear 52 with the rotation of the rotation shaft 54 can be reduced or avoided.

In FIG. 16, ribs 74 provided inside the D-cut hole 56 are squeezing ribs that are squeezed when the D-cut part 55 of the rotation shaft 54 is press-fitted.

The second motor 32 includes a second scale 57 that rotates by driving the second motor 32, and a second encoder (FIG. 9) that detects a rotation amount of the second scale 57. Further, the control unit 35 (FIG. 17) is configured to control the driving of the second motor 32 on the basis of the information detected by the second encoder 58. Since the driving of the second motor 32 is controlled on the basis of the information detected by the second encoder 58, the transportation driving roller 23 can be driven according to the rotation of the target to be driven to thereby reduce the disorder in transportation of the paper sheet.

In this embodiment, the second scale 57 of the second encoder 58 is provided at a position other than the eighth transmission gear 52 and configured to rotate integrally with the rotation shaft 54.

More specifically, the second scale 57 is mounted on the circular press-fit holder 59 (FIG. 7) which is mounted integrally with the rotation shaft 54 by press-fitting the +X side end 54b (FIG. 7, FIG. 11) of the circular rotation shaft 54 into a circular hole. That is, the circular press-fit holder 59 is provided on a second end 54b of the rotation shaft 54 as viewed in the axial direction, which is opposed to the first end 54a on which the D-cut part 55 is provided.

In order to achieve highly accurate transportation by the transportation driving roller 23 (transport roller 20), the second scale 57 of the second encoder 58 is preferably provided to rotate integrally with the rotation shaft 54 of the transportation driving roller 23.

However, if the rotation shaft 54 is mounted on the eighth transmission gear 52 as a drive gear that rotates the rotation shaft 54 by press-fitting the D-cut part 55 formed on the first end 54a of the rotation shaft 54 into the D-cut hole 56 of the eighth transmission gear 52, there is a risk of the eighth transmission gear 52 being eccentric due to the press-fitting. As a consequence, if the second scale 57 is provided on the eighth transmission gear 52, the second scale 57 may also be eccentric, leading to a risk of inaccurate detection of rotation of the rotation shaft 54.

In this embodiment, since the second scale 57 is provided on the circular press-fit holder 59, which is a component other than the eighth transmission gear 52 into which the D-cut part 55 is press-fitted, and configured to rotate integrally with the rotation shaft 54, the rotation of the rotation shaft 54 can be detected while reducing the effect of the eccentricity to thereby achieve highly accurate control of the transportation driving roller 23.

Moreover, since the second scale 57 is mounted on the circular press-fit holder 59 which is mounted integrally with the rotation shaft 54 by press-fitting the rotation shaft 54 into a circular hole, the second scale 57 can be mounted so as to rotate integrally with the rotation shaft 54 while reducing the effect of the eccentricity in the eighth transmission gear 52 in which the D-cut part 55 of the rotation shaft 54 is press-fitted into the D-cut hole 56.

Moreover, since the circular press-fit holder 59 on which the second scale 57 of the second encoder 58 is mounted is provided on the second end 54b of the rotation shaft 54 as viewed in the axial direction, which is opposed to the first end 54a having the D-cut part 55 which is press-fitted into the D-cut hole 56 of the eighth transmission gear 52, in other words, since the eighth transmission gear 52 and the circular press-fit holder 59 are provided on both sides of the rotation shaft 54, the size of the apparatus width can be reduced compared with the configuration in which both the eighth transmission gear 52 and the circular press-fit holder 59 are provided on the same side of the rotation shaft 54. Accordingly, the scanner 1 can be reduced in size.

In this embodiment, the second motor 32 is used as a driving source for the separation roller 14, a driving roller (output drive roller 27) of the output roller 22 which is a "downstream transport roller" provided downstream relative to the transport roller 20, and the regulation unit 40 as well as a driving source for the transportation driving roller 23. The driving mechanism of each component will be described below.

With reference to FIG. 11, a driving mechanism of the separation roller 14 will be first described. As seen from the above description, the transportation driving roller 23 is rotated by the power of the second motor 32. A ninth transmission gear 60 is provided on the inside (−X side) of the circular press-fit holder 59 on the rotation shaft 54 of the transportation driving roller 23. The ninth transmission gear 60 engages with a tenth transmission gear 61. Further, the tenth transmission gear 61 engages with an eleventh transmission gear 63 included in a gear train 62 composed of a plurality of gears. Moreover, there are provided a rotation shaft 64 connected to one of the gear of the gear train 62, a twelfth transmission gear 65 provided on the rotation shaft 64, a thirteenth transmission gear 66 which engages with the twelfth transmission gear 65, and a fourteenth transmission gear 67 which engages with the thirteenth transmission gear 66. The fourteenth transmission gear 67 is provided on the rotation shaft 68 of the separation roller 14.

Accordingly, the power of the second motor 32 is transmitted to the separation roller 14 via the gear train from the seventh transmission gear 51 to the fourteenth transmission gear 67.

While the separation roller 14 is disposed in the upper unit 3, the components in the driving mechanism of the separation roller 14 from the second motor 32 to the ninth transmission gear 60 provided on the rotation shaft 54 of the transportation driving roller 23 are disposed in the lower unit 2 and the components from the tenth transmission gear 61 to the separation roller 14 are provided in the upper unit 3.

Accordingly, when the upper unit 3 is open relative to the lower unit 2 (FIG. 12), the ninth transmission gear 60 located close to the lower unit 2 and the tenth transmission gear 61 located close to the upper unit 3 are separated as shown in FIG. 13.

Next, as shown in FIG. 9, the driving mechanism of the output drive roller 27, which is a driving roller of the output roller 22, will be described.

A sixteenth transmission gear 72 is provided on the rotation shaft 70 of the output drive roller 27 on the +X side end 70a in the apparatus width direction on which the second motor 32 is positioned. The sixteenth transmission gear 72 engages with a fifteenth transmission gear 71 that engages the eighth transmission gear 52 which is a drive gear that rotates the rotation shaft 54 of the transportation driving roller 23. That is, the power of the second motor 32 is transmitted to the sixteenth transmission gear 72 via the seventh transmission gear 51, the eighth transmission gear 52, and the fifteenth transmission gear 71 to thereby rotate the rotation shaft 70 of the output drive roller 27.

Next, with reference to FIG. 14, the following describes the operation and the driving mechanism of the regulation unit 40 that switches the regulation state in which the pressing unit 39, which is configured to press the paper sheets loaded on the medium loading section 11, is prevented from being advanced toward the feed roller 13 and a permission state in which the pressing unit 39 is permitted to be advanced toward the feed roller 13.

First, the operation of the regulation unit 40 will be described. The pressing unit 39 is provided so as to be advanced and withdrawn relative to the feed roller 13, and is biased toward the feed roller 13.

Moreover, the regulation unit 40 is pivotable around a pivot shaft 40a and configured to switch the regulation state (upper figure in FIG. 14) in which the pressing unit 39 is regulated from being advanced toward the feed roller 13 by means of a driving mechanism and a permission state (lower figure in FIG. 14) in which the pressing unit 39 is permitted to be advanced toward the feed roller 13.

The regulation unit 40 in the regulation state supports the bundle of documents G set as described above, thereby preventing the lowermost sheet from being in contact with the feed roller 13.

Further, a recess 40b which is an engagement section is formed on the regulation unit 40. In the regulation state of the regulation unit 40, a distal end 38b of the flap 38 enters the recess 40b as shown in the upper figure in FIG. 14. In this state, the pressing unit 39 resists against a biasing force of a biasing unit, which is not shown, and is lifted by the regulation unit 40 via the flap 38 and remains to be separated from the feed roller 13. In this feeding standby state, the pressing unit 39 does not press the bundle of documents G.

Further, in the feeding standby state, since the distal end 38b of the flap 38 enters the recess 40b of the regulation unit 40, the flap 38 is regulated from rotating about a pivot shaft 38a and holds a blocking position that blocks the medium feeding path. That is, the pivot operation is regulated so that switching is not performed.

The upper figure in FIG. 14 shows that the pressing unit 39 is separated from the feed roller 13, that is, the regulation state in which the regulation unit 40 regulates the pressing unit 39 from being advanced toward the feed roller 13. To the contrary, the lower figure in FIG. 14 shows that the pressing unit 39 is advanced toward the feed roller 13, that is, the permission state in which the regulation unit 40 permits the pressing unit 39 to be advanced toward the feed roller 13.

In addition, the flap 38 is biased by a coil spring (not shown in the figure) provided on the pivot shaft 38a toward the blocking position that blocks the medium feeding path (upper figure in FIG. 14).

Once the feeding of the document starts, the regulation unit 40 is switched from the regulation state to the permission state shown in the lower figure in FIG. 14, thereby allowing the lower most sheet to be in contact with the feed roller 13. As a result, the pressing unit 39 is released from a state of being pushed upward by the regulation unit 40 via the flap 38, and is advanced toward the feed roller 13 by a biasing force from a biasing unit, which is not shown, to thereby press the bundle of documents G toward the feed roller 13.

Then, as the feed roller 13 rotates, the lowermost sheet which is in contact with the feed roller 13 is fed in the downstream direction. This lowermost sheet of the document fed in the downstream direction causes the flap 38 to be switched to the position that opens the medium feeding path shown in the lower figure in FIG. 14. The flap 38 thus prevents the bundle of documents G from being fed in the downstream direction in the feeding standby state (the upper figure in FIG. 14), while the flap 38 does not disturb feeding of the document during feeding of the paper sheet (the lower figure in FIG. 14).

Next, the driving mechanism of the regulation unit 40 will be described.

The eighth transmission gear 52 which is a drive gear of the rotation shaft 54 of the transportation driving roller 23 engages with a seventeenth transmission gear 73. A driving cam 76 (FIG. 8, FIG. 9) of the regulation unit 40 is provided on a rotation shaft 75 of the seventeenth transmission gear 73. The seventeenth transmission gear 73 is provided with a one-way clutch, and configured such that the rotation shaft 75 of the seventeenth transmission gear 73 does not rotate when the eighth transmission gear 52 rotates to cause the transportation driving roller 23 to rotate in the paper sheet transportation direction, that is, when the eighth transmission gear 52 rotates in the clockwise direction in FIG. 8. At this time, the regulation unit 40 is in the permission state (the lower figure in FIG. 14).

On the other hand, when the eighth transmission gear 52 rotates in the direction (the counter-clockwise direction in FIG. 8) opposite to the direction by which the transportation driving roller 23 rotates in the paper sheet transportation direction, the seventeenth transmission gear 73 rotates in the counter-clockwise direction to cause the driving cam 76 to push the regulation unit 40 upward. Thus, the regulation unit 40 is switched from the permission state (the lower figure in FIG. 14) to the regulation state (the upper figure in FIG. 14).

Further, while the transportation driving roller 23 rotates in the paper sheet transportation direction, the rotation shaft 75 of the seventeenth transmission gear 73 does not rotate since the above-mentioned one-way clutch is provided on the seventeenth transmission gear 73. However, the rotation shaft 75 of the seventeenth transmission gear 73 may cause a rattling noise due to the vibration occurred by rotation of the eighth transmission gear 52 or the transportation driving roller 23.

In order to prevent this rattling, a tension spring 78 is provided between the rotation shaft 75 of the seventeenth transmission gear 73 and a hook section 77 on the left side frame 34 as shown in FIG. 18 so that the rotation shaft 75 of the seventeenth transmission gear 73 is biased by the tension spring 78 in the direction perpendicular to the axial direction. In FIG. 18, the seventeenth transmission gear 73 is not shown in order to facilitate illustration of the rotation shaft 75.

As a technique for preventing the rattling of the rotation shaft 75, for example, a leaf spring or bush may be provided in a bearing of the rotation shaft 75 so as to bias the rotation shaft 75 in the axial direction. However, this requires relatively complicated mounting, and an increased load tends to be applied to the rotation of the rotation shaft 75.

Compared to that, a configuration that applies a bias by the tension spring 78 in a direction perpendicular to the axial direction of the rotation shaft 75 is advantageous in that a small load of the tension spring 78 can sufficiently reduce the rattling of the rotation shaft 75, a load to the rotation of the rotation shaft 75 does not readily increase, and the mounting is easy. The tension spring 78 can be mounted on the rotation shaft 75 by using grease or the like to reduce friction between the rotation shaft 75 and the tension spring 78 during rotation of the rotation shaft 75.

In this embodiment, the first motor 31 may also be used as a driving source for other driving system than the feed roller 13. Further, the second motor 32 may also be used as a driving source for other driving system than the transport roller 20, the separation roller 14, the output roller 22, and the regulation unit 40.

In addition, it should be noted that the present invention is not limited to the above embodiments. Various modifications are contemplated within the scope of the invention as defined in the appended claims, and these should be included in the scope of the present invention.

The entire disclosure of Japanese Patent Application No. 2016-119199, filed Jun. 15, 2016 is expressly incorporated by reference herein.

What is claimed is:

1. A medium feeder comprising:
    a feed roller that feeds a medium loaded on a medium loading section to an image reading unit that reads a medium;
    a transport roller disposed downstream relative to the feed roller;
    a first driving source that drives at least the feed roller;
    a second driving source that drives at least the transport roller;
    a separation roller that cooperates with the feed roller to nip the medium therebetween for separation of the paper sheet;
    a downstream transport roller disposed downstream relative to the transport roller;
    a pressing unit that is provided so as to be advanced and withdrawn relative to the feed roller, and is configured to press the medium loaded on the medium loading section when advanced toward the feed roller;
    a regulation unit configured to switch a regulation state in which the pressing unit is regulated from being advanced toward the feed roller and a permission state in which the pressing unit is permitted to be advanced toward the feed roller; and
    a housing that houses the feed roller, the transport roller, the first driving source, and the second driving source, wherein
    the housing includes a lower unit that constitutes a lower part of the housing, and an upper unit that is openable relative to the lower unit, and
    the first driving source and the second driving source are disposed on both sides relative to a center part of the lower unit in a width direction perpendicular to a medium transportation direction, and
    the separation roller, the downstream transport roller, and the regulation unit are driven by the second driving source.

2. The medium feeder according to claim 1, wherein the first driving source and the second driving source are DC motors, the medium feeder comprising:
    a first encoder that detects a rotation amount of a scale that rotates according to driving of the first driving source;
    a second encoder that detects a rotation amount of a scale that rotates according to driving of the second driving source; and
    a control unit that controls driving of the corresponding driving source on the basis of information detected by the first encoder or the second encoder.

3. The medium feeder according to claim 2, wherein
    the first driving source is disposed taking a direction along the width direction as an axial direction of a motor output shaft of the first driving source, and a first transmission mechanism section which is connected to the motor output shaft which extends from a motor main body of the first driving source and transmits a power of the motor is disposed outside the motor main body in the width direction, and
    the first encoder is disposed inside the motor main body of the first driving source in the width direction.

4. The medium feeder according to claim 3, wherein the second driving source is disposed taking a direction along the width direction as an axial direction of a motor output shaft of the second driving source, and a second transmission mechanism section which is connected to the motor output shaft of the second driving source which extends from a motor main body of the second driving source and transmits a power of the motor is disposed outside the motor main body of the second driving source in the width direction,
    the medium feeder comprising:
    a rotation shaft provided with the transport roller; and
    a one-side holder which is mounted on a first end of the rotation shaft in an axial direction and in a portion in which the second driving source is positioned, and is provided with a drive gear configured to rotate the rotation shaft by a power from the second driving source via the second transmission mechanism section, wherein
    the first end of the rotation shaft is provided with a D-cut part having a cross section of a truncated circular shape,
    the one-side holder is provided with a D-cut hole having a shape corresponding to the D-cut part and allows the D-cut part to be press-fitted into the D-cut hole, and
    the scale of the second encoder is provided on a component other than the one-side holder and is configured to rotate integrally with the rotation shaft.

5. The medium feeder according to claim 4, wherein the scale of the second encoder is mounted on a circular press-fit holder which is mounted integrally with the rotation shaft by press-fitting the rotation shaft into a circular hole.

6. The medium feeder according to claim 5, wherein the circular press-fit holder is disposed on a second end of the rotation shaft in the axial direction, which is opposed to the first end of the rotation shaft.

7. The medium feeder according to claim 4, wherein a timing belt is used in the first transmission mechanism section or the second transmission mechanism section.

8. The medium feeder according to claim 1, wherein the first driving source and the second driving source are DC motors, the medium feeder comprising:
    a first encoder that detects a rotation amount of a scale that rotates according to driving of the first driving source;
    a second encoder that detects a rotation amount of a scale that rotates according to driving of the second driving source; and
    a control unit that controls driving of the corresponding driving source on the basis of information detected by the first encoder or the second encoder.

9. An image reading apparatus comprising:
    the reading unit that reads a medium; and
    the medium feeder according to claim 1 that feeds the medium toward the reading unit.

10. A medium feeder comprising:
    a feed roller that feeds a medium loaded on a medium loading section;
    a transport roller disposed downstream relative to the feed roller;
    a first driving source that drives at least the feed roller;
    a second driving source that drives at least the transport roller;

a separation roller that cooperates with the feed roller to nip the medium therebetween for separation of the paper sheet;

a downstream transport roller disposed downstream relative to the transport roller;

a pressing unit that is provided so as to be advanced and withdrawn relative to the feed roller, and is configured to press the medium loaded on the medium loading section when advanced toward the feed roller; and a regulation unit configured to switch a regulation state in which the pressing unit is regulated from being advanced toward the feed roller and a permission state in which the pressing unit is permitted to be advanced toward the feed roller; and a housing that houses the feed roller, the transport roller, the first driving source, and the second driving source, wherein the housing includes a lower unit that constitutes a lower part of the housing, and an upper unit that is openable relative to the lower unit, the first driving source and the second driving source are disposed on both sides relative to a center part of the lower unit in a width direction perpendicular to a medium transportation direction, and the separation roller, the downstream transport roller, and the regulation unit are driven by the second driving source.

11. The medium feeder according to claim 10, wherein the first driving source and the second driving source are DC motors, the medium feeder comprising:

a first encoder that detects a rotation amount of a scale that rotates according to driving of the first driving source;

a second encoder that detects a rotation amount of a scale that rotates according to driving of the second driving source; and a control unit that controls driving of the corresponding driving source on the basis of information detected by the first encoder or the second encoder.

12. The medium feeder according to claim 11, wherein the first driving source is disposed taking a direction along the width direction as an axial direction of a motor output shaft of the first driving source, and a first transmission mechanism section which is connected to the motor output shaft which extends from a motor main body of the first driving source and transmits a power of the motor is disposed outside the motor main body in the width direction, and the first encoder is disposed inside the motor main body of the first driving source in the width direction.

13. The medium feeder according to claim 12, wherein the second driving source is disposed taking a direction along the width direction as an axial direction of a motor output shaft of the second driving source, and a second transmission mechanism section which is connected to the motor output shaft of the second driving source which extends from a motor main body of the second driving source and transmits a power of the motor is disposed outside the motor main body of the second driving source in the width direction, the medium feeder comprising:

a rotation shaft provided with the transport roller; and a one-side holder which is mounted on a first end of the rotation shaft in an axial direction and in a portion in which the second driving source is positioned, and is provided with a drive gear configured to rotate the rotation shaft by a power from the second driving source via the second transmission mechanism section, wherein the first end of the rotation shaft is provided with a D-cut part having a cross section of a truncated circular shape, the one-side holder is provided with a D-cut hole having a shape corresponding to the D-cut part and allows the D-cut part to be press-fitted into the D-cut hole, and the scale of the second encoder is provided on a component other than the one-side holder and is configured to rotate integrally with the rotation shaft.

14. The medium feeder according to claim 13, wherein a timing belt is used in the first transmission mechanism section or the second transmission mechanism section.

* * * * *